Figure 1:
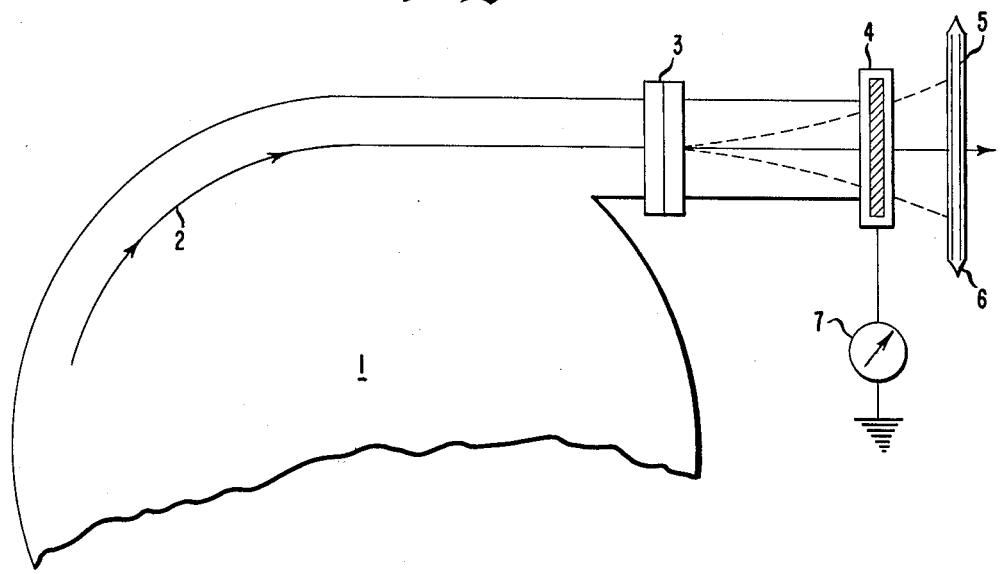

June 8, 1965 E. E. MAGAT ETAL 3,188,228
METHOD OF GRAFT POLYMERIZING AN ORGANIC COMPOUND
TO A SOLID SHAPED CONDENSATION POLYMER STRUCTURE
Filed May 14, 1958 2 Sheets-Sheet 1

INVENTORS
EUGENE EDWARD MAGAT
DAVID TANNER

BY Carl A. Hechmer
ATTORNEY

INVENTORS
EUGENE EDWARD MAGAT
DAVID TANNER

BY *Carl A. Hechmer*
ATTORNEY

United States Patent Office

3,188,228
Patented June 8, 1965

3,188,228
METHOD OF GRAFT POLYMERIZING AN ORGANIC COMPOUND TO A SOLID SHAPED CONDENSATION POLYMER STRUCTURE
Eugene Edward Magat and David Tanner, Wilmington, Del., assignors to E. I. du Pont de Nemours and Company, Wilmington, Del., a corporation of Delaware
Filed May 14, 1958, Ser. No. 735,288
23 Claims. (Cl. 117—62)

This invention relates to product and process. More particularly it concerns a process for chemically adhering an organic compound to a shaped article produced from a synthetic organic condensation polymer and the graft copolymer product formed thereby.

OBJECTS

It is an object of the present invention to provide a process for chemically adhering an organic compound to a shaped article produced from a synthetic organic condensation polymer.

Another object is to provide a novel shaped article comprising a solid synthetic organic condensation polymer to which an organic compound is grafted.

Another object is to provide shaped articles of a solid synthetic organic condensation polymer having new and desirable properties obtained by grafting an organic compound to the said shaped article without substantial sacrifice of those properties inherent in the unmodified condensation polymer. The modified polymer is thus known as a graft copolymer. Thus, as an example, in accordance with this invention a textile formed from a condensation polymer may be provided which is freer from static, more dyeable, more resistant to soiling, more resilient or crease resistant, and shows better adhesion to elastomers, and the like, than textiles heretofore obtainable from the said condensation polymer.

It is a still further object of this invention to provide a process whereby a shaped article of condensation polymer such as a textile can be modified in its properties, as explained hereinabove, by applying a suitable modifier to a shaped substrate, and inducing chemical bonding therebetween.

A still further object of this invention is to provide a process for modifying a shaped condensation polymer throughout its bulk by applying a suitable vinyl monomer to the surface thereof, permitting it to penetrate throughout the substrate, and inducing grafting to said shaped condensation polymer.

Yet another object of this invention is to provide a process for modifying a shaped article of synthetic condensation polymer by grafting to it a non-polymerizable organic chemical compound.

Still another object of this invention is to provide a process for modifying a textile formed from shaped condensation polymer filaments by applying to said textile a highly fluid polymeric material or fluid polymeric solution, coating each filament uniformly and continuously, and inducing chemical bonding therebetween, whereby a surface-modified filament and textile is obtained, which retains the attractive handle and aesthetic properties of the original textile.

Another object of this invention is to provide a bactericidal textile with a germicide permanently grafted thereto.

These and other objects will become apparent in the course of the following specification and claims.

STATEMENT OF INVENTION

In accordance with the present invention a shaped article produced from a synthetic organic condensation polymer, in intimate contact with an organic compound, is subjected to bombardment by ionizing radiation to produce chemical bonds between the shaped article and the organic compound. In one embodiment, an organic modifier is applied to the surface of a shaped article produced from a synthetic organic condensation polymer and the shaped article is thereafter irradiated with ionizing radiation to induce chemical bonding. For deep seated modification the organic compound is permitted to diffuse into the substrate prior to the irradiation. Alternatively, the organic modifier, especially when it is of high molecular weight, may remain upon the surface of the polymer substrate during the irradiation step, thus producing a uniform coating chemically grafted to the polymer substrate. The organic compound employed as modifier may be a non-polymerizable organic compound or it may be polymerizable; either form is chemically grafted to the shaped article formed from an organic condensation polymer.

DEFINITIONS

By the term "synthetic organic condensation polymer" is meant a polymer which can be formed by polymerization with elimination of small molecules such as HCl, $H_2O$, NaCl, $NH_3$, and the like. These polymers are also characterized by their ability to hydrolyze to a monomer. Another characteristic which distinguishes condensation polymers (for instance, from addition polymers) is that the repeating units which form an integral part of the polymer chain are linked by other than carbon-to-carbon bonds. Among such polymers may be mentioned polyamides, polyureas, polyurethanes, polyesters, polyoxymethylenes, polyethers (epoxy polymers), polyacetals, polysulfonamides, and the like, and copolymers of such materials. These polymers are comprehensively discussed by Flory in "Principles of Polymer Chemistry," Cornell University Press, Ithaca, N.Y. (1953), pp. 37–50. The preferred condensation polymers are those which are substantially linear, i.e., those which are produced from predominantly difunctional reactants. By "substantially" linear is meant that minor amounts of cross-linking may be present (prior to irradiation), provided the polymer exhibits the general solubility and melting characteristics of a linear, as distinguished from a highly cross-linked polymer.

By "graft copolymer" is meant a polymer which is modified, after polymerizing and shaping, by chemically bonding thereto, molecules of a chemically dissimilar organic compound.

By "irradiation" is meant the process by which energy is propagated through space, the possibility of propagation being unconditioned by the presence of matter (as distinguished from mere mechanical agitation in a material medium such as is characteristic of energy produced by a sonic or ultrasonic transducer), although the speed, direction, and amount of energy transferred may be thus affected.

By "ionizing radiation" is meant radiation with sufficient energy to remove an electron from a gas atom, forming an ion pair; this requires an energy of about 32 electron volts (ev.) for each ion pair formed. This radiation has sufficient energy to non-selectively break chemical bonds; thus, in round numbers radiation with energy of 50 electron volts (ev.) and above is effective for the process of this invention. The ionizing radiation of the process of this invention is generally classed in two types: high energy particle radiation, and ionizing electromagnetic radiation. The effect produced by these two types of radiation is similar, the essential requisite being that the incident particles or photons have sufficient energy to break chemical bonds and generate free radicals.

The preferred radiation for the practice of this invention is high energy ionizing radiation, and has an energy equivalent to at least 0.1 million electron volt (mev.). Higher energies are even more effective; there is no known upper limit, except that imposed by available equipment.

By an "organic compound" is meant a material having the formula $CX_4$ where X is a member of the group consisting of hydrogen, halogen, nitrogen, nitrogen radical, oxygen, oxygen radical, sulfur, sulfur radical or organic radical. By "organic radical" is meant a radical predominantly hydrocarbon except for the presence of substituents immediately hereinbefore listed. Where one or more of the X's is organic radical, it is preferred that it be linked to the CX residue by a carbon-to-carbon bond. Furthermore, the C may be doubly bonded to no more than one S= or O= atom; i.e., only one pair of X's may be replaced by a divalent oxygen or sulfur atom. Typical compounds included are hydrocarbons, alcohols, acids, ethers, ketones, esters, aldehydes, isocyanates, sulfonates, mercaptans, thioethers, disulfides, nitriles, nitro compounds, amines, amides, and halides. Compounds with ethylenic unsaturation are especially preferred, since a minimum radiation dose is required to graft a given weight of modifier. However, non-polymerizable organic compounds (free from aliphatic unsaturation) are also readily grafted, to produce effective modification of polymer properties. Of these compounds, the chain transfer agents are preferred.

Another useful class of modifiers is the high molecular weight compounds, especially polymers. These compounds are readily and effectively grafted since a single site of attachment bonds a relatively large weight of modifier, due to the large molecular weight. The large molecule tends to prevent penetration by these modifiers, and hence they are especially useful in creating surface effects. The polymeric modifiers especially preferred for textile uses are those which may be applied to the textile as a low viscosity solution or melt, thus ensuring that each filament is completely coated.

DRAWINGS

FIGURE 1 is a target arrangement for sample bombardment with proton, deuteron, and alpha particles. In the illustration the particle is accelerated in cyclotron 1 and following emergent particle path 2 passes through window and beam defocusing arm 3 where the beam is spread. Thereafter the spread beam is passed through carbon shutter 4 impinging on sample 5, the said sample being enclosed in wrapper 6. Electrometer 7 measures the beam-out current at the carbon shutter.

Figure 2:
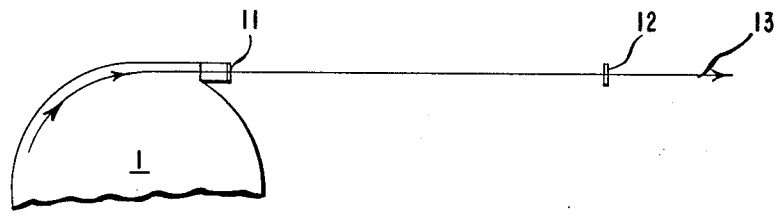

FIGURE 2 shows a section of the defocused beam pattern. The rectangular checker area 8 represents the irradiated area of sample with curves 9 and 10 denoting intensity distribution along the x and y coordinates of the sample, respectively.

Figure 3:
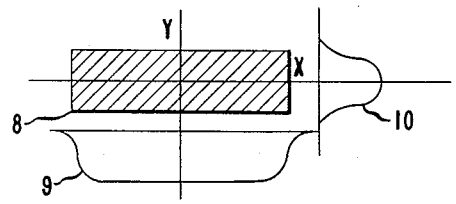

FIGURE 3 is a typical target arrangement for fast neutron bombardment. Beryllium target 11 is bombarded with 24 mev. deuterons generated in cyclotron 1. The neutrons produced are impinged on target 12 disposed along the emergent neutron beam 13.

Figure 4:
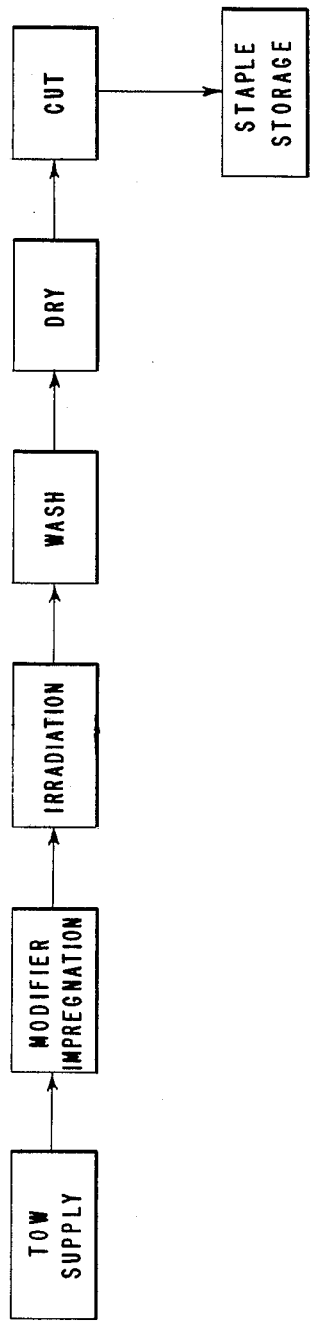

FIGURE 4 is a flow sheet illustrating a typical embodiment wherein the process of the present invention is applied to a yarn tow which after impregnation with modifier, radiation, a wash, a drying operation and cutting is available as modified staple for yarn production.

EXPERIMENTAL PROCEDURES AND UNITS

Compositions are given in parts by weight or weight percent, unless otherwise noted.

Radiation dosages are given in units of "mrad" (millions of rads), a "rad" being the amount of high energy radiation of any type which results in an energy absorption of 100 ergs per gram of water or equivalent absorbing material. Alternatively, dosages may be indicated in terms of exposure in watt seconds per square centimeter of substrate treated.

Unless otherwise noted, "66 nylon fabric" employed in the examples is a taffeta fabric, woven from 70 denier polyhexamethylene adipamide continuous filament yarn having a denier per filament of 2.0. The polyamide is produced from hexamethylenediamine and adipic acid (ergo "66"), and has a relative viscosity (as defined in United States Patent No. 2,385,890) of 37, 39 equivalents of $-NH_2$ ends and 92 equivalent of $-COOH$ ends per $10^6$ grams of polymer (referred to hereinafter as 39 amine ends and 92 carboxyl ends, respectively). The polymer is prepared using 0.34 mol percent acetic acid stabilizer (which ends are, of course, not titratable), which is equivalent to 15 amine ends. From these data, following the method of G. B. Taylor and J. E. Waltz ("Analytical Chemistry," vol. 19, p. 448, 1942), the molecular weight (number average) is calculated to be about 13,700.

This analytical method is useful not only for determining end groups present in unmodified polymer, but it may be used also to determine the number of active acidic or amine end groups attached to polyamides by the grafting reaction. However, since the above method requires solution of the polymer sample in hot benzyl alcohol, and some of the polymers of this invention are not completely soluble in this solvent, other procedures are useful. For example, satisfactory results are obtained by gently boiling a 0.33 gram sample of polymer in 10 ml. aqueous 0.1 N NaOH, followed by backtitrating the excess base with 0.1 N HCl using bromo-cresol green indicator.

The "standard washing" to which samples are subjected consists of a 30-minute immersion in 18 liters of 70° C. water contained in a 20-liter agitation washer. The wash solution contains 0.5% of detergent. The detergent employed is that sold under the trademark "Tide" of Procter and Gamble Company of Cincinnati, Ohio. This detergent contains, in addition to the active ingredient, well over 50% (sodium) phosphates (Chemical Industries, 60, 942, July 1947). Analysis shows the composition to be substantially as follows:

| | Percent |
|---|---|
| Sodium lauryl sulfate | 16 |
| Alkyl alcohol sulfate | 6 |
| Sodium polyphosphate | 30 |
| Sodium pyrophosphate | 17 |
| Sodium silicates and sodium sulfate | 31 |

The static propensity of the fabric is indicated in terms of direct current resistance in ohms per square, measured parallel to the fabric surface, at 78° F. in a 50% relative humidity atmosphere. High values, reported as the logarithm (to the base 10) of the resistivity (log R) indicate a tendency to acquire and retain a static charge. It should be noted that highly hydrophobic unmodified polymer substrates have such a high resistivity that the log R determined may depend somewhat on the sensitivity of the meter employed; log R values of 13 to over 15 have been observed, using the same fabric and different meters. However, these differences substantially disappear when a satisfactory antistatic modification is produced, e.g., for log R values of 11 or less. Moreover, data reported in any given example are consistent, i.e., all measurements were made on the same instruments under the same conditions. A meter suitable for this determination is described by Hayek and Chromey, American Dyestuff Reporter, 40, 225 (1951).

Wickability as measured in the examples is determined by placing a drop of water upon the fabric, and measuring the diameter of the wet spot after a standard time interval, e.g., 60 seconds. Alternatively, especially useful where decreased wickability is obtained, is a determination of the length of time required for a drop placed upon the fabric to disappear by soaking into the fabric. Discrepancies observed between control fabrics in the different examples are thought to be due to different preparation techniques. Data within each example are comparable.

Where quantitative values for hole melting are presented, they are measured by dropping heated glass beads of constant weight and diameter from a fixed height from a constant temperature oven onto the fabric. The temperature at which the fabric is stained is called the first damage temperature, and the temperature at which the glass bead melts completely through the fabric is referred to as hole-melting temperature. Where the hole-melting tendency is presented in qualitative terms, the designation "poor" (referring to polyamides) denotes a quantitative rating of about 300° C.; "fair"—a rating of about 400° C. to about 500° C.; "good"—a rating of about 600° C. or slightly better; and "excellent"—a rating well over 600° C.

The fiber melt temperature reported in some examples is determined by placing a thread, unraveled from a fabric if necessary, upon an electrically heated tube and observing the tube temperature at which visible melting, fusing of filaments to the tube, or instantaneous decomposition occurs.

Post-formability is evaluated by contacting a sample yarn with a tube heated to about 225° C. A fiber which can be drawn in contact with the tube and without substantially fusing the filaments, to two or three times its original length is designated "elastic." When the stretch is retained without restraint after cooling, it is designated "post-formable."

Crease recovery is evaluated by crumpling a fabric in the hand, and observing the rate at which it recovers from this treatment. Wet crease recovery indicates the rate and extent of disappearance of creases from the crumpled fabric when it is wetted. Numerical values are obtained using the Monsanto Crease Recovery Method, described as the "vertical strip crease recovery test" in the American Society for Testing Materials Manual, Test No. D1295–53T. In determining wet crease recovery by this method, the specimens are soaked for at least 16 hours in distilled water containing 0.5% by weight of "Tween 20," a polyoxyalkylene derivative of sorbitan monolaurate, a wetting agent marketed by the Atlas Powder Company, Wilmington, Del. Immediately prior to testing, excess water is removed from the test fabrics by blotting between layers of a paper towel. Results are reported as percent recovery from a standard crease in 300 seconds.

The following examples are cited to illustrate the invention. They are not intended to limit it in any manner.

Example 1

A sample of "66" nylon fabric is soaked in liquid methoxydecaethyleneoxy methacrylate. After removal of excess liquid by wringing, but while still wet, it is enclosed in an aluminum foil wrapper and subjected to electron irradiation in a 1 mev. resonant transformer with a beam-out current of 560 microamperes. The sample is placed on a conveyor belt which carries it through the electron beam at a rate of 16 inches per minute. At the sample location, the beam supplies an irradiation dose, for textile samples, of $5.6 \times 10^6$ rad (5.6 mrad) per pass. The sample is traversed back and forth across the beam until a total dose of 17 mrad is attained. The sample is given the standard wash, rinsed in distilled water and dried. Its direct current resistance in ohms is then measured. Its logarithm is 9.8. After five washings, the value rises only to 10.7. After ten additional washings, the value increases only to 10.9. This compares favorably with cotton (a material with but little tendency to accumulate static charges) which has a value of 10.8. The product has a softening point of 239° C., and except for a trace, is soluble in 98% formic acid. A control sample of the original fabric has a log resistivity of 13.2, a softening point of 247° C., and is completely soluble in formic acid. When exposure of the soaked, wrapped sample to irradiation is increased to 67 mrad, although the product displays good antistatic properties (a log resistivity of 10.7), it is insoluble in 98% formic acid and is infusible, indicating a high degree of cross-linking.

Example 2

In order to test the penetration of electron radiation into relatively thick samples, sixty samples of polyhexamethylene adipamide fabric are individually padded with liquid methoxydecaethyleneoxy methacrylate and thereafter stacked into a flat package of a thickness equal to the sum of the thicknesses of the sixty pieces, a total of about 0.24 inch. The package is wrapped in aluminum foil and is irradiated from one side only in the equipment and under the conditions of Example 1 to a total irradiation dose of 33 mrad. The samples, numbered from 1 to 60, beginning at the top (nearest the electron source) are then subjected to a series of various treatments during which the log resistivity of selected samples, after being rinsed and dried, is measured and is reported in Table 1. The first treatment is a series of 15 consecutive standard washings. Column "A" is the observation taken after the second washing, while column "B" is taken after the 15th. The 15 consecutive washings are followed by a sodium chlorite bleach and another standard washing, the subsequent observation being shown in column "C." The samples are then washed 14 hours in synthetic detergent. Column "D" reports the log resistivity observed. Finally the samples are given 5 consecutive washings in hot soapy water, these final values being shown in column "E."

TABLE I

| Sample No. | A | B | C | D | E |
|---|---|---|---|---|---|
| 2 | 9.2 | 10.1 | 10.1 | 10.1 | 10.3 |
| 8 | 9.1 | 10.0 | 10.0 | 9.9 | 10.3 |
| 12 | 9.5 | 10.1 | 10.1 | 10.3 | 10.5 |
| 16 | 9.7 | 10.5 | 10.5 | 10.2 | 10.7 |
| 20 | 9.8 | 10.7 | 10.7 | 10.7 | 11.0 |
| 24 | 10.1 | 10.6 | 10.6 | 10.8 | 11.1 |
| 26 | 10.6 | 12.2 | 12.2 | 12.3 | 13.2 |
| 30 | 12.9 | 13.3 | 13.3 | 13.1 | 13.3 |
| 35 | 13.5 | 13.1 | 13.1 | | |
| 40 | 12.8 | 13.3 | 13.3 | | |
| 45 | 13.3 | | | | |
| 50 | 13.1 | | | | |
| 60 | 13.1 | | | | |

These results show that the electron beam penetrates the fabric pile far enough to induce appreciable modification in about the top 30 fabric layers. The total thickness effectively penetrated by the 1 mev. electrons is about 0.1 inch (0.25 cm.).

Example 3

A series of nylon taffeta fabrics are scoured in a solution containing 0.5% olive oil soap flakes and 0.46% trisodium phosphate. The scoured fabrics are soaked 8 hours in an aqueous solution containing 25% acrylic acid. Excess liquid is removed from the samples, and they are packaged in 5 mil polyethylene film packets and are then irradiated. The radiations used in this example are produced in a cyclotron, arranged to bombard the samples with high speed protons, deuterons, alpha particles, or neutrons. Duplicate samples for each test are provided. The arrangement of the samples with respect to the cyclotron, for charged particle irradiation is shown in FIGURE 1. In this example a distance from window to carbon shutter of 24" and from carbon shutter to sample of 5" is used, the beam width at the sample being 7 cm. FIGURE 2 shows schematically the distribution of the charged particles as they impinge upon the fabric samples. Ionized hydrogen molecules ($H_2^+$) are accelerated in the cyclotron, but are dissociated to form a proton ($H_1^+$) beam on passing through the carbon shutter. Fast neutrons are produced by bombarding a beryllium target with 24 mev. deuterons. The emergent beam from the beryllium target impinges upon the sample a at distance of 30 inches from the target, arranged as shown in FIGURE 3. These neutrons at this position have an average energy of 10 mev.

After irradiation, the ungrafted acrylic and polyacrylic acid is removed by rinsing the fabrics in distilled water, boiling them for 1 hours in a 5% aqueous solution of sodium carbonate, rinsing again in distilled water, followed by boiling in a 2% aqueous solution of acetic acid followed by a second distilled water rinse. The solution-to-fabric weight ratio is 500:1 in each operation. The exposure conditions and the results of the tests given to each sample are indicated in Table 2. Prior to testing, duplicate swatches to Samples 3A, 3B, 3C, and 3D are dyed with a basic dye as shown in Example 16. The location of the irradiated portion is clearly seen because it is deeply dyed by the basic dye, due to the grafted polyacrylic acid. Fabric tests subsequently made on duplicate Samples 3A to 3D are carried out on the areas corresponding to those which were deeply dyed.

The weight gain due to acrylic acid grafted to each sample is indicated in Table 2, as well as the total of original carboxyl groups plus those attached to the nylon via grafting, as determined by titration as explained hereinabove. Carboxyl group concentration found in a typical control nylon Sample (3E) is shown for comparison. Following the carboxyl group determination, a portion of each sample is boiled for 1 hour in 5% aqueous sodium carbonate, forming the sodium salt of the grafted acrylic acid. The log R values are indicated in Table 2. In addition, the wickability of the sodium salt of the grafted acrylic acid modification is determined; its resistance to hole melting is estimated by dropping hot ashes from a burning cigarette upon the fabric.

It is shown that a bulk modification has been obtained by hydrolyzing the nylon-acrylonitrile graft by a 30-minute boil-off in 3% sodium hydroxide. The fabric, which now contains a large number of additional carboxyl groups due to hydrolysis of the nitrile groups, is then dyed with a basic dye (Du Pont Brilliant Green as in Example 16). Cross sections of filaments taken from these fabrics are deeply dyed throughout the modified filament, whereas only light shades are observed in cross sections of filaments taken from control fabrics which had received the same caustic boil-off and dyeing treatment without irradiation. The hydrolyzed test fabric has a log R of 9.4 to 13.3 for control.

*Example 5*

The process of this invention is readily carried out using gamma-rays, for example, derived from cobalt 60 as shown in this example. A nylon taffeta sample is soaked for 16 hours in a 15% aqueous solution of maleic acid and is then wrapped in aluminum foil while soaking wet. The foil package is wrapped around a ¾ inch glass tube which in turn is inserted in a 1½ inch glass tube. This combination is lowered into a cobalt 60 source of gamma radiation (1.3 mev. gamma-rays). The dose rate available from this source is 7200 mrads per minute. After a total dose of 27.5 mrads, the sample is removed and scoured in hot water. After extracting ungrafted

TABLE 2.—IRRADIATION CONDITIONS AND PROPERTIES OF THE MODIFIED SAMPLES

| Particles | Sample number | | | | |
|---|---|---|---|---|---|
| | 3A | 3B | 3C | 3D | 3E |
| | 12 mev. H+ | 48 mev. He++ | 24 mev. D+ | 10 mev. neutrons | Control |
| Current (mμ amp.) | 20 | 80 | 40 | | |
| Total beam exposure (μ amp.-hr.) | 0.0005 | 0.0020 | 0.0010 | | |
| Integrated current flux (μamp. sec./cm.²) | 0.12 | 0.48 | 0.24 | | |
| Accumulated exposure (μa.-hrs.) | | | | 100 | |
| Dosage mrad | 1 | 1 | 1 | | 0. |
| Percent weight gain of the sample exposed to the beam | 13.9 | 17 | 14.5 | 3.5 | |
| COOH/10⁶ g | 1,900 | 2,350 | 1,950 | 500 | 90. |
| Log R | 7.5 | 7.5 | 7.5 | 10.1 | 13.3. |
| Wickability of the sodium salt (time in sec. for the disappearance of a drop of water) | <3 sec | <3 sec | <3 sec | 3 sec | >60 sec. |
| Hole-melting resistance | Very good | Very good | Very good | Half-way between control and samples 3A, 3B, 3C. | Very poor. |

H+=proton.  He++=α particles.  D+=deuteron.

*Example 4*

A sample of "66" nylon fabric is immersed in liquid acrylonitrile. It is then wrapped in aluminum foil and irradiated with 2 mev. X-rays, as described below, until a dose of 23 mrad is attained.

The sample is exposed to X-radiation using a resonant transformer X-ray machine marketed by the General Electric Company, Schenectady, N.Y., known as a "Two Million Volt Mobile X-ray Unit." This machine is described by E. E. Charlton and W. F. Westendorf in the Proceedings of the First National Electronics Conference, p. 425, October 1944. The packaged sample is placed in an open top box made from 1/16 inch seet lead, and positioned so that the sample is 8 cm. from the tungsten tube target. At this location, using a tube voltage of 2 mev., and a tube current of 1.5 milliamperes, the irradiation rate for the sample in question is 1.2 mrad per hour. The beam irradiates a circle about 3 inches in diameter; all fabric tests are made on the irradiated portion.

Following the irradiation, ungrafted polymer is removed by washing with dimethylformamide. After 15 standard "Tide" washings, the dried nylon fabric has a superior crease recovery and greater resilience than before treatment by the process of this invention.

A second sample is immersed in liquid acrylonitrile. It is then wrapped in aluminum foil and irradiated as before to a dose of 5 mrads. After thorough rinsing, the weight gain is 12%. Larger irradiation doses produce larger weight gains.

maleic acid, a weight gain of 5% is observed. When a portion of the fabric is dyed with a basic dye, the dyed cross-section shows that the maleic acid has penetrated the fiber, and is grafted throughout its interior. When the maleic acid-grafted nylon is converted to the calcium salt by boiling in 1% calcium acetate solution, the resulting fabric is found to have excellent resistance to hole melting.

*Example 6*

A sample coded 6A of "66" nylon fabric is immersed in liquid acrylonitrile. It is then wrapped in aluminum foil and irradiated in the apparatus and under the conditions of Example 1 until a dose of 17 mrads is attained. The product softens at 240° C. and is almost completely soluble in formic acid. It is observed to possess a higher crease resistance and greater resiliency than the original sample. This improved resiliency is retained even after 15 standard washings following a washing in dimethylformamide (a solvent for polyacrylonitrile).

The test is repeated with nylon Samples 6C and 6D, which are soaked in solutions of acrylonitrile, water and methanol as indicated in Table 3, for 24 hours at 25° C. Each sample (6C, 6D) is enclosed in a polyethylene bag with excess solution and irradiated, using a Van de Graaf generator under the conditions listed below:

Voltage, mev. _____ 2
Tube current, microamps _____ 290
Conveyor speed, in./min. _____ 40
Dose per pass, mrad _____ 1

Number of passes _____ 2
Total dose, mrad _____ 2

After a hold-up time of 2 hours, the samples are thoroughly rinsed in dimethylformamide at 70° C., followed by acetone and then water. The weight gain of each is determined and listed in Table 3. The breaking strength of representative yarn samples from each fabric is determined after 0 and 500 hours exposure to ultraviolet light in a weatherometer. A control, 6B, is included in the table for comparison purposes; the control is not exposed to the high energy electrons.

TABLE 3

| Sample | Grafting solution | Percent wt. gain | Yarn breaking strength, gm. | |
|---|---|---|---|---|
| | | | 0 hour | 500 hr., weatherometer |
| 6B | None | None | 386 | 30 |
| 6C | 5/22/22 [1] | 10.1 | 393 | 58 |
| 6D | 25/12/22 | 36.1 | 402 | 100 |

[1] Solution composition=ml. acrylonitrile/ml. H₂O/ml. CH³OH.

The grafted acrylonitrile greatly increases the light durability of the nylon.

*Example 7*

A series of sample swatches of tropical worsted staple fabric prepared from polyethylene terephthalate filaments are soaked in a 50% solution of acrylonitrile dissolved in a mixed solvent of 42% ethanol and 58% water, and are then heated at 90° C. for 30 minutes. The fabric samples are transferred to stainless steel pans containing 200 ml. of the treating solution, and irradiated for one pass (dose, 1 mrad) under a 2 mev. electron beam at 250 microamps. The irradiation temperature is 90° C. The grafted fabric is extracted in boiling dimethylformamide to remove unreacted monomer and unattached polymer, after which it is dried at 80° C. The observed weight gain is 4.4%. The test is repeated, with fabric Samples 7A, 7B, and 7C. The composition of treating solutions, radiation dose and weight gain are shown in Table 4.

The acrylonitrile-grafted polyethylene terephthalate is found to be more resistant to alkaline hydrolysis (e.g., resistant to scouring) than the ungrafted fabric; it is also more resistant to soil pickup. Fabrics Samples 7A to D, in which 7D is a control bearing no grafted acrylonitrile, are subjected to a laboratory test for laundry soiling. In this test fifty ¼ " steel balls, 0.1 g. of vacuum cleaner soil, 0.04 g. carbon black, and 20 ml. of Wagg oil* are

*WAGG OIL COMPOSITION

| | G. |
|---|---|
| Coconut oil | 1.2 |
| Peanut oil | 1.2 |
| Cottonseed oil | 1.2 |
| Lauric acid | 0.4 |
| Myristic acid | 0.4 |
| Palmitic acid | 1.2 |
| Stearic acid | 0.8 |
| Oleic acid | 1.0 |
| Cholesterol | 2.2 |

Add carbon tetrachloride to make 1 liter of solution.

placed in a pint "Launder-Meter" jar. After evaporation of the oil vehicle, 100 ml. of 0.1% soap solution (commercial laundry soap) is added. This mixture is then conditioned (with occasional stirring) for 1 hour at 72° C. Two 3" x 3" fabric swatches (test+cotton control) are placed in each jar, and the mixture is tumbled for 1 hour. The swatches are then removed, rinsed thoroughly, and allowed to dry. Each swatch is then pressed for 30 seconds at 160–170° C. using a hand iron. Reflectances are measured before and after washing and after pressing. At least 3 samples of each fabric are used (3 jars), and the reflectances averaged. Results are recorded either as differential in reflectance (DR) between original sample and washed sample, or differential between original sample and ironed sample. The difference in reflectance of the samples is determined before and after the laundry test and is indicated in the column headed DR of Table 4. A low value for DR indicates nearly complete removal of soil, whereas a high value for DR indicates a fabric which retained all the applied soil. Cotton normally gives a DR value of 7 to 9, which is considered satisfactory. It is observed that soil removal improves with the amount of acrylonitrile grafted. In addition, the grafted polyethylene terephthalate fabric is more resistant to an alkaline hydrolysis. This is shown in the last column of Table 4, wherein the ratio of weight loss for the test item to that of control (7D) is indicated for a two-hour boil in 1% sodium hydroxide solution. Again, increased amounts of grafted acrylonitrile show increased alkaline stability. When the test is repeated using (a) a mixture of acrylonitrile and alpha-methylstyrene or (b) acrylonitrile and styrene, resistance to alkaline hydrolysis is improved over that obtained when only acrylonitrile is grafted.

A portion of Sample 7C is dryed for 2 hours at the boil with a disperse dye, in a bath containing 0.13 gm./l. "Celanthrene" Fast Pink 3B (C. I. No. Disp. Red 11), 1.0 g./l. of an anionic hydrocarbon-sodium-sulfonate softener, 2.5 g./l. dimethyl terephthalate, 2.5 g./l. benzamide. A bath-to-fabric ratio of 40:1 is employed. The dye is exhausted, and the scoured Sample 7C has a deep, attractive shade. Control 7D, similarly dyed, does not exhaust the bath, and the shade is much lighter.

A second portion of 7C is dyed, using the cuprous ion technique, as follows: the sample is placed in a bath (bath-to-fabric ratio, 40:1) at 72° C. containing (based on weight of fabric) 1% Quinoline Yellow PN (C.I. No. Acid Yellow 2), 0.1% sodium salt of unsaturated longchain alcohol sulfate (wetting agent); the temperature is raised to 82° C., and 2.5% copper sulfate is added, followed by 1.0% hydroxyl ammonium sulfate; the bath is then heated to the boil for 2 hrs., followed by a scour. Test Sample 7C is dyed a good shade, whereas in an attempt to similarly dye the control, 7D, it remains uncolored.

As indicated in Examples 6 and 7, highly useful products are obtained by grafting unsaturated nitriles to condensation polymer substrates. These products, in general, have improved light durability, resistance to soiling, static, and alkaline hydrolysis. Partial hydrolysis of the acrylonitrile grafted to polyethylene terephthalate results in fibers and fabrics that are more readily dyeable especially with basic dyes; the polymer substrate is also protected against hydrolytic degradation. Improvement in wickability and comfort is also noted. In addition to acrylonitrile, as shown in Examples 6 and 7, other unsaturated nitriles are useful, such as the α-substituted nitriles, for example, methacrylonitrile, the cyano substituted styrenes, dinitriles such as vinylidene dinitrile and the like.

Atlhough useful modifications are obtained when as little as 1% acrylonitrile is grafted to the substrate, it is desirable to graft from 4 to 70% by weight; the preferred range is from 10 to 50% weight increase for polyamides.

TABLE 4.—ANTISOILING AND AKLALINE SENSITIVITY OF POLYETHYLENE TEREPHTHALATE

| Sample No. | Treat soln., percent AN [1] | Percent wt. gain | Dose, mrad | D.R. | Alkaline sensitivity |
|---|---|---|---|---|---|
| 7A | 20 | 2.0 | 1 | 12 | 0.84 |
| 7B | 20 | 2.4 | 2 | 11 | 0.74 |
| 7C | 50 | 4.4 | 1 | 8 | 0.71 |
| 7D | Control | none | | 17–20 | 1.00 |

[1] AN=Acrylonitrile in ethanol-water solvent.

Example 8

This example illustrates the preparation of a nylon bearing hydroxyl groups, obtained via grafting of vinyl ester, followed by hydrolysis.

Four samples of "66" nylon taffeta (coded 8A to 8D) are soaked for 20 hours in freshly-distilled vinyl acetate. Each fabric sample is sealed in a polyethylene bag along with 30 ml. of vinyl acetate. Air is excluded from the package. The fabrics are irradiated using a Van de Graaf electron accelerator for the total dosage indicated in Table 5. After irradiation, the fabrics are extracted with acetone for 24 hours, using a Soxhlet extractor, followed by vacuum drying over $P_2O_5$. The observed weight gains are indicated in Table 5.

The combined nylon samples having a total weight of 14 grams, are boiled for 1½ hours in 2 liters of 0.2 N NaOH, thus hydrolyzing the vinyl acetate. The fabrics are then thoroughly rinsed in hot distilled water and dried over $P_2O_5$. The weight loss shows that the grafted polyvinyl acetate is completely hydrolyzed to give polyvinyl alcohol groups. The number of hydroxyl groups calculated from the weight grain is indicated in Table 5.

TABLE 5.—NYLON WITH GRAFTED POLYVINYL ACETATE

| Sample | Dose, mrad | Polyvinyl acetate wt. gain, percent | —OH groups/$10^6$ gm. polymer after hydrolysis |
|---|---|---|---|
| 8A | 2 | 12.9 | 1,200 |
| 8B | 3 | 34.7 | 2,640 |
| 8C | 4 | 49.9 | 3,550 |
| 8D | 5 | 63.0 | 4,250 |

Nylon bearing grafted hydroxyl groups has a drier hand, greater liveliness and improved wickability as compared to control nylon. The log R values are about 12.0, as compared to greater than 13.3 for an unmodified nylon control.

The process is carried out employing the procedure outlines in FIGURE 4. In this embodiment, a 3 denier per filament tow of nylon is passed through a bath containing vinylacetate. After squeezing excess liquid from the tow, it is irradiated, excess homopolymer is extracted by passing through an acetone bath, the tow being thereafter dried and cut. The speed of the tow through the process is adjusted to provide a radiation dosage of 2 mrad. Fabric produced by weaving yarn spun from this modified staple is thereafter hydrolized. Obviously, the modified structure may be hydrolyzed at any stage, i.e., as tow, as staple, as spun yarn, as fabric or the like.

A swatch 8E of polyethylene terephthalate staple fabric is immersed in 150 g. of 100% vinyl acetate and heated at 60° C. for 30 minutes. The fabric is transferred to a 7" x 11" stainless steel pan containing 200 ml. of the pad solution. The fabric is then irradiated at 60° C. for a total irradiation dose of 3 mrad. The grafted fabric is extracted in boiling acetone for two hours to remove unreacted monomer and unattached polymer, after which it is dried at 80° C. A weight gain of 14% is noted. When the above procedure is repeated with Sample 8F, using 1 pass, the weight gain is 5.0%.

Sample 8E is highly dyeable at the boil with disperse dyes, has good dye penetration and rapid dye rate in contrast to an unmodified control fabric, 8G, which must be dyed with a carrier in order to obtain acceptable shades. Both 8E and 8F have increased resistance to caustic hydrolysis; Sample 8F shows a 60% lower rate of attack than control, 8G.

A typical procedure for dyeing with dispersed dyes is as follows. A one gram fabric sample is boiled for 2 hours in a 40 ml. bath containing 0.02 gm. of a blue dye (1,4-diamino-anthraquinone-N-α-methoxypropyl-2, 3-dicarboximide, disclosed in U.S. Patent 2,753,356), and 0.04 gm. of an anionic hydrocarbon-sodium sulfonate. After dyeing, the sample is scoured for 20 minutes at 82° C. in water containing 2% of a condensation product of ethylene oxide and a fatty alcohol.

Example 9

This example illustrates the direct grafting of unsaturated alcohols to condensation polymer substrates. Fabric samples are soaked for 1 hour at 95° C. in liquid modifiers, as indicated in Table 6, and are then irradiated to a dose of 10 mrad at the soaking temperature. The samples are washed 5 times to remove excess reagents, and are then dried. In some instances, the weight gain is determined. When tested for wickability, the time required for a standard drop of water to disappear is listed in Table 6. It is noted that the grafted alcohols significantly increase the wickability of the nylon.

TABLE 6

| Sample | Substrate [1] | Modifier | Dose, mrad | Wt. gain, percent | Wickability, sec. for drop to disappear |
|---|---|---|---|---|---|
| 9A | N | None | none | none | 700 |
| 9B | D | do | none | none | 1,800 |
| 9C | N | Dicyclo-pentenyl alcohol | 10 | | 34 |
| 9D | N | Allyl alcohol | 10 | 1.4 | 68 |
| 9E | D | Dihydroxy-dipyrone | 10 | | 630 |
| 9F | N |  | 10 | 8.1 | 59 |

[1] Nylon fabrics indicated by N, polyethylene terephthalate fabrics by D.

In addition to the indicated alcohols, other hydroxyl-bearing compounds may be grafted such as, for example, furfuryl alcohol, tropolone, 2-hydroxy(2,2,1)-bicyclohept-5-ene, propargyl alcohol, 2-methyl-3-butyn-2-ol, 2,2-dihydroxymethyl-(2,2,1)-bicyclohept-5-ene, 3 - hydroxyclopentene.

It is desirable to graft sufficient modifier so that, after hydrolysis, there remains at least about 100 equivalents of hydroxyl groups per million grams of polymer. The preferred range is from 500 to 2000 hydroxyls, although useful results are often obtained with 5000 or more hydroxyl groups. These graft copolymers bearing hydroxyl groups have improved dyeability, especially when using acidic dyes. They have reduced static propensity as compared to unmodified polymer, and in addition are more wickable. The may be cross-linked by treatment with formaldehyde, diisocyanates, or diepoxy compounds, whereby they are rendered more resilient, infusible and water repellent. When post-reacted with perfluorocarboxylic acids they become soil repellent and oleophobic.

Other compounds suitable for post-reaction with grafted hydroxyl or carboxyl groups are diepoxides such as: butadiene diepoxide, dicyclopentadiene diepoxide, vinylcyclohexene diepoxide, divinylbenzene diepoxide, diglycidyl ether.

Example 10

Four samples, 10A, 10B, 10C and 10D, of a "66" nylon fabric are irradiated with the equipment and in accordance with the technique of Example 1. Prior to irradiation, three of the samples are immersed in solutions of chlorine containing monomers as identified below.

Sample 10A:                Parts by weight of the solution
  p-Chlorostyrene _____ 15
  Benzene _____ 85
Sample 10B:
  p-Chlorostyrene _____ 15
  Maleic anhydride _____ 5
  Benzene _____ 70
Sample 10C:
  Vinylidene chloride _____ 85
  Vinyl acetate _____ 15

Sample 10D is employed as a control, i.e., it is irradiated without being given any coating. Each sample is subjected to a radiation dose of 33 mrad. Thereafter each sample is subjected to 10 consecutive standard washings. From a chlorine analysis of each sample the amount of each modifier bonded to the fabric is calculated. These analyses are listed in Table 7. The number of equivalents of halogen per million grams polymer are also calculated.

TABLE 7

| Sample | Percent chlorine in fabric | Equivalents of halogen per 10⁶ gm. polymer | Percent modifier in fabric |
|---|---|---|---|
| 10A | 0.12 | 34 | 0.47 |
| 10B | 0.10 | 28 | 0.39 |
| 10C | 0.54 | 152 | 0.73 |
| 10D | 0.018 | | |

It is thus apparent that approximately 0.5% of each modifying agent is chemically bonded to the fabric under the influence of the high energy particle bombardment.

A strip of Sample 10C, 1″ x 6″, is held vertically over the flame from a match; the ignited fabric is self-extinguishing. When the test is repeated with control Sample 10D, the same is completely consumed.

Example 11

Six samples of nylon taffeta, coded 11A to 11F, are soaked in water for 1 hour at 60° C., followed by a methanol soaking for 1 hour at 60° C., thus pre-swelling the fiber. The samples are then soaked in the solutions indicated in Table 8, for a period of 20 hours. The samples are placed in polyethylene bags, each containing about 20 ml. of a grafting solution, sealed with Scotch tape and irradiated for the specified dosage, using the 2 mev. Van de Graaf accelerator. After a 1 hour lag time following the irradiation, the samples are extracted in a Soxhlet extractor, using the solvents indicated in the table. After rinsing in water, the fabrics are dried over $P_2O_5$, and the weight gain is determined. The results of the determination are indicated in Table 9. For comparison, Samples 11G, H, I are padded with a coating of polyvinyl chloride deposited upon it from solution; due to the high molecular weight of this modifier compared to the monomers used for Samples 11A to 11F, no penetration is attained.

TABLE 8

| Sample No. | Treating agent | Dose, mrad | Solvent used in 24 hr. extraction |
|---|---|---|---|
| 11A | 75% $CH_2=CCl_2$ in methanol | 1 | Tetrahydrofuran, acetone, water. |
| 11B | Same as 11A | 2 | Same as 11A. |
| 11C | do | 5 | Do. |
| 11D | $CCl_2=CF_2$ | 20 | Methanol; std. wash. |
| 11E | 35% $CH_2=CHCl$ in cyclohexane. | 12 | Tetrahydrofuran. |
| 11F | 85% $CH_2=CCl_2$ + 15% vinyl acetate. | 1 | Acetone. |
| 11G | 1% polyvinyl chloride in tetrahydrofuran. | none | None. |
| 11H | 2% polyvinyl chloride in tetrahydrofuran. | none | Do. |
| 11I | 5% polyvinylchloride in tetrahydrofuran. | none | Do. |

Following the grafting and washing, fabric Sample 11F is analyzed to confirm the presence of chlorine. A positive test is obtained, showing 2.05% chlorine on the fabric. The samples are then tested for flammability, following the method described in Manual and Yearbook of AATCC, 1954, pages 120–123, the method consisting of subjecting a 1.5 inch x 6 inch fabric sample, tilted at an angle of 45° in a metal frame, to a standardized flame, and visually observing the flammability. (Method is coded AATCC 33–52.) These results are listed in Table 9, along with the equivalent concentration of grafted halogen.

TABLE 9

| Sample No. | Wt. gain, percent | Equivalents[1] of halogen/ 10⁶ gm. | Percent Cl | Fabric | Flammable molten polymer |
|---|---|---|---|---|---|
| 11A | 6.8 | 1,400 | [2] ND | No | Yes. |
| 11B | 8.9 | 1,830 | ND | No | Yes. |
| 11C | 14.2 | 2,900 | ND | Yes | ND. |
| 11D | 4.3 | 1,290 | ND | No | ND. |
| 11E | 6.8 | 1,090 | ND | No | No. |
| 11F | 5.9 | [3] 577 | 2.05 | No | ND. |
| 11G | 2.3 | ND | ND | Yes | ND. |
| 11H | 5.1 | ND | ND | Yes | ND. |
| 11I | 13.1 | ND | ND | Yes | ND. |

[1] Calculated from weight gain.
[2] Items marked ND are not determined.
[3] Calculated from Cl analysis.

It is noted that Samples 11G, H, I although coated on the surface with polyvinyl chloride, showed increased flammability with increasing amounts of polyvinyl halide. This is thought to be due to the fact that at least some penetration of the fiber by the vinyl halide is required in order to impart satisfactory non-flammability. It is also noted that Sample 11C with 14.2% weight gain, is flammable. Thus excessive amounts of grafted vinyl halide are not desirable.

It is also of interest to compare the weight gain of Sample 11F (5.9%) with the weight gain of Sample 10C of Example 10 (0.73%). The same modifier is used in each case, with a much larger dose of irradiation for Sample 10C which usually increases the amount grafted. The greater amount of polyvinyl chloride grafted onto 11F is thought to be due to the fact that the nylon is preswollen prior to exposure to the modifier, so that a high degree of penetration is obtained.

Three denier per filament nylon tow (without preswelling) is modified with 75 percent vinylidene chloride by the technique described in Example 8 using a dosage of 1 mrad. Tetrahydrofuran is employed to extract unreacted monomer. Fabric is produced from the modified staple by conventional means.

Observation of the treated fabric during attempts to ignite it indicates that non-flammability of fabric is caused by evolution of hydrogen chloride at the melting temperature of nylon, combined with favorable viscosity of the melt, which forms foam. This foam excludes air and dilutes and cools volatile combustible degradation products of nylon below their ignition point, even though the molten polymer itself is flammable. Excessive amounts of grafted vinyl halide appear to lower the viscosity of the polymer during the ignition-melting process so that the foamed melt drops away from the fabric or filament and does not quench the flame. Thus, flammable fabrics are obtained when more than about 15% of polyvinyl chloride is grafted.

*Example 12*

Non-polymerizable halogen-containing compounds are also useful in producing a flame-resistant fabric. Samples of nylon taffeta, 12A to 12D, are soaked in the liquids indicated in Table 10 for several hours at room temperature. They are then wrapped in aluminum foil while dripping wet, and exposed to electrons from the Van de Graaf accelerator, for a total dose of 60 mrad. They are then extracted in a Soxhlet for 24 hours, using ethanol solvent. The percent halogen, based on fabric weight, is determined and is indicated, along with the treating agent in Table 10. The halogen equivalents per $10^6$ gram are calculated. Attempts are made to ignite the fabric samples with a burning match, without success. Nylon samples given the same soaking and extraction treatment, but without the irradiation, are readily ignited with a burning match.

TABLE 10

| Sample No. | Treating agent | Percent halogen (on fabric) | Equivalents halogen/$10^6$ g. | Ignited by match |
|---|---|---|---|---|
| 12A | Carbon tetrachloride | 1.18 | 332 | No. |
| 12B | Chloroform | 1.55 | 436 | No. |
| 12C | Tetrachloroethylene | 1.52 | 428 | No. |
| 12D | Methylene bromide | (1) | | No. |

[1] Not determined.

When the test is repeated, using fabric samples prepared from nylon staple, similar results are obtained; when the staple samples are subjected to the quantitative test, described in Example 11, they are all found to be nonflammable.

The preferred saturated compounds for producing flame-proof fabrics are the chain-transfer agents, especially those containing at least one and preferably several halogen atoms in the molecule, e.g., carbon tetrachloride, chloroform, methylene bromide, and the like. Compounds with high chain-transfer constants are preferred. Chlorine and bromine containing compounds are preferred to those containing iodine and fluorine. It is desirable to pre-swell the polymeric substrate before or during impregnation with the halide-bearing compound. Samples preswollen before impregnation require a lower irradiation dosage to graft an equivalent amount of halogen.

The unsaturated vinyl halides are particularly preferred for producing flame-resistant fabrics, since large amounts are readily grafted using small doses of irradiation, thus contributing to low cost and efficient throughput. The preferred halides are those compounds with a high content of halogen. The low molecular weight compounds are also especially desirable, because they more readily penetrate the substrate.

Since many of the condensation polymers are prepared by melt polymerization, and are conventionally melt spun to form filaments, which are thereafter woven into fabrics, their melt rate and thus their flame-resistance may be controlled by grafting thereto halogen compounds as shown in this example. In general, some protection is obtained by grafting of 100 equivalents of halogen per million grams of polymer; the preferred range, however, is from 200 to 700 equivalents although modifications as high as 2000 equivalents are often useful. It is usually desirable to avoid grafting as much as 3000 equivalents of halogen.

*Example 13*

A 14″ x 9″ nylon fabric Sample 13A is sealed in a polyethylene bag with 30 ml. of hydroquinone stabilized, freshly distilled acrolein, and soaked for 24 hours. While still sealed in the bag, it is irradiated to a dose of 1 mrad using the Van de Graaf electron accelerator. Following the irradiation, the sample with the grafted acrolein is Soxhlet extracted with acetone for 24 hours and vacuum dried over $P_2O_5$. The weight gain is 4.5%, and the fabric has a log R of 12.4, as compared with a value of over 13.3 for an unmodified control. The test fabric also is somewhat stiffer than that of the control.

When the test is repeated, with a new nylon Sample 13B using inhibitor-free acrolein, and a dose of 6 mrad, a weight gain of 25.0% is obtained. When fabric 13B is heated to a temperature of 180° C., it appears to become somewhat cross-linked and is then resistant to hole melting.

When nylon fabric Sample 13B is heated for 2 hours at 70° C. in a solution of ethanol plus p-toluene sulfonic acid, it is believed that acetylization takes place. The sample treated in this manner shows a large increase in wickability, and a small change in electro-resistivity. Similar results are obtained with a fabric of polyethylene terephthalate filaments.

In addition to acrolein, other unsaturated aldehydes are readily grafted to polymer substrates, such as for example, methacrolein, furfural, acroleindiethylacetal and the like. Saturated graftable aldehydes include formaldehyde, acetaldehyde, glutardialdehyde, benzaldehyde, dextrose and the like. It is desirable to graft on at least about 100 equivalents of aldehyde groups per million grams of polymer to produce noticeable effect; the preferred range is from 500 to 2000 or more equivalents, whereas as much as 5000 equivalents are desirable for some uses.

As aldehydes, these graft copolymers have improved dyeability. In addition, they may be cross-linked through an aldol condensation or other cross-linking reaction whereby melt resistance is improved. These graft copolymers may also react with compounds containing hydrophobic groups (e.g., stearamide) whereby they become water repellent. Their adhesion to elastomer and vinyl plastics is improved over the adhesion of condensation polymers, when contacted with aldehyde-reactive adhesives.

*Example 14*

Nylon taffeta samples are soaked in a solution of 15 ml. of methanol and 15 ml. of 4-vinylpyridine, under the conditions shown in Table 11. Following the soaking, each sample is packaged in a polyethylene bag and is irradiated at the soaking temperature, with the dose shown. Each sample is washed four times in distilled water at 80° C. and the weight gain (Table 11) is determined upon the dried fabric.

TABLE 11

| Sample No. | Soaking temp., °C. | Soaking time, min. | Dose, mrad | Wt. gain, percent |
|---|---|---|---|---|
| 14A | 25 | 120 | 1 | 2.2 |
| 14B | 60-65 | 20 | 1 | 16.0 |
| 14C | 60-65 | 20 | 2 | 27.0 |

Sample 14C, having grafted pyridine groups, is heated at the boil for ½ hour in a solution containing two drops of concentrated sulfuric acid in 100 ml. of water. The resulting fabric is highly wickable, and has a log R value of 55% RH of 8.5. The wet crease recovery is markedly improved in comparison with an unmodified control fabric.

Other amines are readily grafted to condensation polymer substrates, such as for example, allylamine, vinylamine, diamino-octadiene, N,N-diallylmelamine and the like. When N,N-diallylmelamine is grafted to polyamide fabric, followed by cross-linking with aqueous formaldehyde, a fabric with increased resilience and resistance to hole melting is produced.

*Example 15*

Although a wide variety of amines can be grafted to condensation polymer substrates, the particularly preferred amines for conferring improved acid dyeability are those which are sufficiently heat stable so that they do not cause excessive yellowing when the fabric is subjected to heat-setting conditions. The preferred modifiers are those nitrogenous organic bases, containing carbon-carbon unsaturation either isolated or conjugated with a carbonyl function, and which bear amine groups in either of the following configurations: (A) primary amine groups, with no hydrogen atoms on the carbon adjacent to nitrogen, and (B) tertiary amine groups, with no hydrogen atoms on the carbon atoms beta to the tertiary nitrogen. The grafting of these compounds is illustrated in this example.

Nylon taffeta samples are soaked for 20 hours in a solution containing 0.54 gram of the preferred amine, 0.25 gram of acetic acid and 1.6 ml. of water per gram of fabric. After soaking, the wet fabrics are wrapped in aluminum foil and irradiated with a dose of 5 mrad. The samples are then washed at 60° C. with Tide for one hour, rinsed once at 60° C. for one hour, and twice at room temperature for 10 minutes. After drying for five minutes at 90° C. the samples are weighed to determine the weight changes accompanying grafting.

The fabric samples are dyed by boiling for one hour in a solution consisting of 50 ml. of water, 0.1 g. of dye, and 5 ml. of 10% aqueous potassium acid phthalate solution per gram of fabric. The dyed samples are then washed for 15 minutes in Tide solution at 60° C., rinsed twice with distilled water, and dried by heating to 90° C. in a forced air oven for five minutes.

The amount of dye taken up by each sample of saturation dyed fabric is determined by dissolving a weighed sample of the fabric in formic acid, and measuring the optical density of the solution at a wave length appropriate to the dye used in this case, the wave length is 330 m$\mu$ for anthraquinone blue GA (C.I. Acid Blue 58) dye. Quantitative results are obtained by comparison with standard solutions of the dye. The values obtained, along with the number of amine ends grafted are indicated in Table 12. For purposes of comparison, an unmodified, unirradiated control nylon has a dye uptake of 1.90%.

TABLE 12

| Sample No. | Compound grafted | Amine ends Introduced/ 10⁶ gm. | Dye uptake, percent |
|---|---|---|---|
| 15A | 3,3 dimethyl-4-dimethyl-amino-1-butene. | 59.5 | 4.15 |
| 15B | 2,2 dimethyl-3-dimethyl-amino-propyl acrylate. | 55.6 | 3.95 |
| 15C | N-acrylyl tetramethylethylene diamine. | 47.2 | 3.09 |
| 15D | N-diacrylyl tetramethylethylene diamine. | 45.1 | 3.15 |
| 15E | N-(2,2-dimethyl-3-dimethyl-aminopropyl) acrylamide. | *311.00 | 3.49 |

*Excess homopolymer not removed by scour, but removed in acidic dye bath.

*Example 16*

The process of this invention is useful for introducing amine groups to improve the dyeability of condensation polymer substrates using non-polymerizable compounds, in addition to the vinyl amines shown hereinabove.

One sample of "66" nylon fabric (Sample 16A) is immersed in a solution of 50 parts hexamethylene diamine and 50 parts water. A second sample of this same fabric (Sample 16B) is immersed in liquid bis(3-aminopropoxy)-ethane. These samples are then irradiated along with an untreated control (Sample 16C) with the equipment and in accordance with the technique of Example 1, to a total dosage of 33 mrad. Each sample is subjected to 15 standard washing. Separate 10 gram portions of each of the samples are then dyed competitively with an acid dye and with a basic dye for one hour at a temperature between 95–100° C.

Acid dye bath composition:                                  Gm.
   Du Pont Milling Red 3B dye (C.I. #430) __ 0.05
   Octyl phenyl polyether alcohol * _____ 0.2
   Ammonium acetate buffer _____ 0.5
   Distilled water _____ 484.0

Basic dye bath composition:

Du Pont Brilliant Green crystals
    (C.I. #662) _____ 0.1
   Octyl phenyl polyether alcohol * _____ 0.2
   Distilled water _____ 500.0

* A wetting agent sold by the Rohm and Haas Company of Philadelphia, Pa., under the name of "Triton" X–100.

TABLE 13

| Sample | Acid dye (red) | Basic dye (green) |
|---|---|---|
| 16A | Much darker than control | Much lighter than control. |
| 16B | Darker than control | Do. |

The control, Sample 16C, shows only slight change in its dye-ability over a swatch of the original, non-irradiated and uncoated fabric. Cross sections of the acid-dyed filaments of Sample 16A show uniform dyeing throughout, proving that the diamine penetrated the fiber before grafting.

The receptivity of the fabric toward basic dyes may be improved by substituting an acid modifier (such as adipic acid) for the amines employed above; in addition, the adipic acid grafted nylon has a softer hand than untreated control.

In order to effectively improve the dyeability of condensation polymer fabrics, it is desirable to graft a minimum of 50 equivalents of amines per million grams of polymer; it is preferred, however, to graft 120 to 3000 equivalents. Most satisfactory results are obtained when the amines penetrate throughout the entire thickness of the fiber; thus, deep shades are obtainable, and there is no danger of color change as the fabric wears, such as occurs when merely ring or surface dyeing is obtained. As a minimum, the dye should penetrate at least 10% along the radius in two denier per filament yarn (e.g., a distance of 0.8 micron in a yarn of 16 micron diameter). The same minimum distance (i.e., 0.8 micron) is adequate on yarns of higher denier per filament.

*Example 17*

A sample of fabric woven from continuous filament polyethylene terephthalate immersed in liquid bis(3-aminopropoxy)ethane and thereafter irradiated in the equipment and in accordance with the technique of Example 1 to a total dosage of 33 mrad. The coated sample, an uncoated, irradiated comparative control and a swatch of the original fabric are subjected to 15 standard washings. They are thereafter immersed for one hour at 95–100° C. in the acid dye bath of Example 16. After thorough rinsing it is observed that neither of the comparative control samples is affected by the dye. The coated, irradiated fabric dyes a bright red. A microscopic examination of the cross section of the dyed fibers discloses that they are "ring dyed."

*Example 18*

The process of this invention may be employed to graft a dyestuff directly to a condensation polymer substrate. This process is illustrated in the following example.

A dyestuff is prepared by reacting a dye containing an amino group with methacrylyl chloride, to form the unsaturated dye 1-(2-methacrylamidophenylazo)-2-naphthol. In the preparation of the methacrylyl derivative, a solution of 6.6 g. of 1-(p-aminophenylazo)-2-naphthol in 160 ml. of benzene is cooled to 0° C. and 2.9 g. methacrylyl chloride in 40 ml. benzene is added slowly. The reaction mixture is allowed to warm to room temperature, then heated slowly to reflux. After refluxing 4 hours, the contents are cooled and filtered. The filtrate is concentrated to ¼ volume and filtered. The combined solids are extracted with acetone, which is then evaporated to yield the dye. The dye product is recrystallized from 95% acetic acid; it has a melting point of 181–183° C. The parent dye, 1-(p-aminophenylazo)-2-naphthol, is prepared by diazotizing p-nitroaniline and coupling to 2-naphthol. This product is then reduced by sodium sulfide and the product purified by the hydrochloride, the melting point being 136–144° C.

A swatch of nylon fabric is dyed at 82–88° C. for 1 hour with the above unsaturated dye, in a bath containing 2% of the sodium salt of a long-chain alcohol sulfate, 1% trisodium phosphate, 1.0% dye, based on weight of fabric. The bath ratio (by weight) is 40 parts liquor to one part fabric. Following the dyeing, the fabric wetted with the dye is irradiated (exposure of 5 mrad) using the 2 mev. Van de Graaff electron accelerator. The dyed irradiated fabric is then subjected to repeated extraction with boiling dimethylformamide to remove ungrafted dye. The fabric with irradiation-grafted dye has a much deeper shade than an irradiated, untreated control, and also a much deeper shade than a dyed, extracted control that was not irradiated.

Thus, by the process shown in this example, suitable unsaturated compounds containing suitable chromophoric groups may be grafted to fibers of condensation polymers. Typical chromophoric groups are —N=N—, >C=C<, >C=N—, >C=O, and —N=O.

These chromophoric groups will usually be present in conjugation and the color value of the group will usually be modified by one or more substituents, as is well known to those skilled in the art. Suitable auxochrome groups will usually be substituted, in order to increase both the tinctorial value and the substantivity of the dye. However, since the process of this invention permits direct chemical bonding of the dyestuff to the polymer substrate, the substantivity of the dye is of minor importance. Thus, dyes may be used which ordinarily produce unsatisfactory shades on condensation polymer substrates. Dyes which may be used include the nitroso, nitro, monoazo, disazo, trisazo, and tetrazo types. Stilbene, pyrazolone, ketoneimine, di- and triphenylmethane and xanthene dyes are effective. Acrydine, quinoline, thiazole, indimine, indophenol, and azine dyes may be employed. Aniline black and the related dyes are also useful, as well as oxazine and thiazine dyestuffs. Sulfide dyes, known as sulfur dyes, are effective as well as the hydroxyketone, hydroxyquinone and hydroxylactone dyes. Anthraquinone dyes of the acid, mordant and vat types are suitable, as well as the arylido quinone and indigoid dyestuffs.

It will usually be desirable to react a readily graftable monomer with some functional group in the dyestuff molecule, whereby the dye is readily attachable to the polymer substrate, avoiding excessive doses of radiation. Such excessive doses are usually to be avoided, since the shade of the dyestuff may be affected by the irradiation. Alternatively, some dyestuffs may be grafted directly, without the introduction of additional unsaturated groupings, especially when unsaturation is already present in the molecule.

*Example 19*

Three swatches of nylon fabric, 19A to 19C, are soaked in treating solution as indicated in Table 14. After the soaking period, they are wrapped in polyethylene film, and are irradiated to the indicated dosage. Following the irradiation, they are treated in a Soxhlet extractor for 24 hours with the solvent listed.

TABLE 14

| Sample No. | Treating solution | Soak time, hr. | Soak temp., °C. | Dose, mrad. | Extraction solvent |
|---|---|---|---|---|---|
| 19A | 80% glycidyl methacrylate in methanol. | 24 | 25 | 7 | Methyl-ethyl ketone. |
| 19B | 10% glycidyl methacrylate+40 ml. methyl acrylate. | 5 | 25 | 7 | Do. |
| 19C | Redistilled vinylisocyanate | 24 | 25 | 10 | Cyclohexane. |

Following the extraction treatment, the sample swatches are dried and weighed. Strips one inch wide of the grafted fabric are then cured in contact with various rubber substrates. Following the curing, the fabric is peeled back 1", then fabric and rubber base are clamped in an Instron tester, and the force required to strip the grafted fabric from the cured rubber is measured in pounds per inch. The results are listed in Table 15, along with the results obtained with numerous other modifiers which, when grafted to nylon as disclosed hereinabove or following the procedure of this example, increase adhesion to rubber.

TABLE 15

| Sample No. | Modifier | Percent grafted | Tear adhesion, lbs./in. | Elastomer |
|---|---|---|---|---|
| 19A | Glycidyl methacrylate | 15.9 | 5.2 | Natural rubber. |
| 19B | Glycidyl methacrylate+methyl acrylate. | 64.5 | 6.0 | Do. |
| 19C | Vinyl isocyanate | 13.3 | 10.0 | GRS rubber. |
| 19D | Butadiene | 9.9 | >40.0 | Do. |
| 19E | Butadiene+styrene | 34.2 | >40.0 | Do. |
| 19F | Butadiene+acrylonitrile | 16.5 | >40.0 | Do. |
| 19G | Acrolein | 26.2 | 3.0 | Butyl rubber. |
| 19H | Vinyl alcohol | 23.0 | 3.5 | Neoprene rubber. |
| 19I | Episulfide of glycidyl methacrylate. | 23.4 | 10.0 | GRS rubber. |

In Table 16 are indicated the curing conditions under which the treated fabrics are cured to the rubber slab, and in addition the adhesion of control (unmodified) nylon to the various elastomers.

TABLE 16.—ELAST. CURING CONDITIONS

| Elastomer | Time, min. | Temp., °C. | Adhesion, unmodified nylon control, lbs./in. |
|---|---|---|---|
| GRS rubber | 45 | 141 | 6.8 |
| Natural rubber | 45 | 141 | 2.8 |
| Butyl rubber | 45 | 153 | 1.8 |
| Neoprene rubber | 45 | 141 | 1.7 |

The vulcanized test samples are prepared as follows: strips of fabric of 1" x 5¾" of the test materials are laid on uncured 5¾" x 6" rubber slabs. The whole system is put in a hot mold and cured for the stated time at the specific temperature, under a mold pressure of 114.9 lbs./in.²

Thus, according to the process of this invention, the fabric prepared from condensation polymer has improved adhesion to various types of elastomers, when certain vinyl monomers are grafted thereto; for GRS rubber, butadiene, butadiene-styrene and butadiene-acrylonitrile combinations are especially effective.

*Example 20*

A sample of "66" nylon fabric is immersed in liquid diallylbenzene phosphonate. It is then irradiated with electrons accelerated by the 2 mev. generator to a total dosage of 40 mrad. It is given 15 consecutive standard washings. The diallylbenzene phosphonate coated sample displays a greater degree of stiffness and water repellency than the uncoated, irradiated comparative control. It is thought that the increased stiffness and resilience are due to cross linking of the grafted diunsaturated modifier.

When the test is repeated, soaking the nylon fabric in 5% aqueous methylene bis-acrylamide, at a temperature of 80° C., followed by irradiation with a dose of 1 mrad, a 2.8% weight gain is noted after ungrafted polymer has been removed. The modified nylon is insoluble in formic acid and infusible to the touch of a cigarette ash. A second application of the solution followed by similar irradiation dose results in a 7% total weight gain. The fabric appears to be more resilient than the unmodified nylon. The fabric is highly wickable, but does not have the cold, clammy, slippery hand in the wet state that often accompanies high wickability.

*Example 21*

Other di-unsaturates may be grafted to improve the resilience of nylon, presumably by a cross-linking mechanism.

Nylon Samples 21B and 21C are grafted with butadiene-acrylonitrile and butadiene-styrene mixtures, following the techniques disclosed hereinabove. After irradiation grafting, the samples are extracted with benzene to remove excess homopolymer, and are then tested for crease recovery with the results shown in Table 17. Included also is an untreated nylon control, Sample 21A. Both of the grafted samples show an improved crease recovery both wet and dry, as compared to the unmodified control.

TABLE 17

| Sample No. | 21A (control) | 21B | 21C |
|---|---|---|---|
| Modifier | none | (1) | (2) |
| Grafted, percent | none | 68 | 25 |
| Crease recovery, warp: | | | |
| Dry | 68 | 85 | 81 |
| Wet | 68 | 85 | 81 |

1 Butadiene/acrylonitrile.
2 Butadiene/styrene.

It is often desirable that grafting conditions (e.g., temperature, dose, etc.) be adjusted so that residual unsaturation remains after the grafting step is completed, thereby leaving the double bonds available for further crosslinking or for improving adhesion. This will not ordinarily require unusual precautions; suitable conditions have been disclosed hereinabove.

It has been shown that a variety of di-unsaturated modifiers are useful for cross-linking reactions. Often combinations of monomers are more effective than a single one. Examples of suitable modifiers are butadiene, butadiene plus styrene, butadiene plus acrylonitrile, isoprene, chloroprene, methylene bisacrylamide, divinylstyrene, divinylbenzene and the like. Usually monomers with short stiff chains between the vinyl groups are more effective than those with flexible chains. Improved adhesion has been described in terms of adhesion to elastomers, but improved adhesion to other substrates is readily obtained. For example, nylon batting modified with a 46.5% graft of glycidyl methacrylate shows improved adhesion in polyester resin laminates. Thus, following the procedure shown in this example, condensation polymer fabrics and filaments may be treated to improve adhesion not only to elastomers but also to vinyl plastics, papers, laminating resins, adhesives, inks and film coating compositions and the like. In effect, a permanent "anchor surface" has been grafted to the polymer substrate.

*Example 22*

Nylon fabric Sample 22A is soaked for 24 hours at room temperature in a solution of 40% glycidyl methacrylate in methanol. After soaking, the fabric is squeezed between layers of filter paper and passed through a clothes wringer, then wrapped in aluminum foil. The sample is irradiated at room temperature under the beam of the 2 mev. Van de Graaf electron generator for a total dosage of 5 mrad. After exposure, the non-grafted material is removed by a 24 hour Soxhlet extraction with methylethylketone. After drying over $P_2O_5$, a weight gain of 4.0% is observed.

The test is repeated, using nylon fabric Samples 22B, C, D, and E. The treating solutions are mixtures of glycidyl methacrylate (GMA), methanol and water, as indicated in Table 18. The soaking time is indicated in the table. These samples are irradiated in individual polyethylene bags containing 50 ml. of the treating solution. Following irradiation at the dose indicated in the table, they are subjected to the same extraction treatment as Sample 22A. After extraction, the weight gains are determined (Table 18). Fabrics 22B, C, and D are

TABLE 18

| Sample No. | Treating soln. (percent by wt.) | Treating time, hr. | Dose, mrad. | Wt. gain, percent |
|---|---|---|---|---|
| 22A | 40% GMA, 60% $CH_3OH$ | 24 | 5 | 4.0 |
| 22B | 10% GMA, 45% $CH_3OH$, 45% $H_2O$ | 48 | 1 | 12.6 |
| 22C | 10% GMA, 45% $CH_3OH$, 45% $H_2O$ | 48 | 2 | 17.3 |
| 22D | 10% GMA, 45% $CH_3OH$, 45% $H_2O$ | 48 | 3 | 24.5 |
| 22E | 20% GMA, 40% $CH_3OH$, 45% $H_2O$ | 24 | 2 | 51.4 | white and have a soft and silk-like hand. Fabric Sample 22E is stiffer than unmodified nylon, has a pleasant dry hand, and shows improved adhesion to rubber when tested according to the procedure of Example 19.

Other epoxy compounds are also suitable for grafting to polymeric substrates; for example, 4.1% butadiene monoxide is grafted to nylon using an irradiation dosage of 6 mrad. Other suitable compounds are vinyl glycidyl ether, allyl glycidyl ether, N-vinylcyclohexene monoxide and the like. The epoxide groups grafted to the nylon via attachment of the compounds of this example improve adhesion to various rubbers.

*Example 23*

A swatch of "66" nylon taffeta fabric, coded 23A, of 2.4 g. is sealed in a polyethylene bag along with a solution of 30 g. vinylstearate in 40 ml. methanol plus 30 ml. dioxane. After heating for 45 minutes at 70° C., the whole system is irradiated while hot with 2 mev. electrons for a total dosage of 10 mrad. After a hold-up period of one hour the fabric is treated with benzene in a Soxhlet extractor for 24 hours, followed by a 30-minute wash in water (70° C.) containing 0.3% "Tide" detergent. After rinsing in water and drying in a vacuum desiccator over $P_2O_5$ a weight gain of 2.7% is obtained. The fabric has a wax-like hand. The water repellency as determined by A.A.T.C.C. method 22–52, has a rating of 50–70 vs. 0–50 for control.

The percentage surface area expansion after wetting of the fabric is 4%, vs. 4.7% for unmodified control nylon.

The above procedure is repeated, using a fresh swatch of nylon, 23B, and soaking it in 100% vinyl stearate for 60 minutes at 80° C., followed by irradiation to a dose of 20 mrad. The weight gain is 17.1%. The fabric has a wax-like hand. The greater part of the vinylstearate is grafted on the surface of the fabric. The percentage surface area expansion after wetting is 2.6%.

Suitable compounds for improving the water repellence of shaped articles of synthetic linear condensation polymer include the acrylates of long chain aliphatic alcohols, the vinyl esters of long chain aliphatic acids, and vinyl ethers of long chain aliphatic hydrocarbons.

*Example 24*

A one-mil film of biaxially oriented polyethylene terephthalate is wet with monomeric glycidyl methacrylate, wrapped in two-mil aluminum foil and irradiated with 2 mev. electrons to a dosage of 5 mrad. The film is then heated for one hour at 100° C. and finally extracted to constant weight with acetone at room temperature. A weight gain of 2.2% is obtained. The film is unchanged in appearance. It is highly adherent to polymeric epoxide adhesives and adhesion is not lost upon immersion in water.

*Example 25*

Following the procedures described hereinabove, specified amounts of various water-repellent compounds are grafted to nylon and polyethylene terephthalate fabrics, as indicated in Table 19. The increase in water repellence is indicated by the increased length of time required for a drop of water placed upon the fabric to disappear. Values for comparative unmodified controls are included in Table 19.

TABLE 19

| Compound grafted | Wt. gain, percent | Wickability, drop life in sec. |
|---|---|---|
| "66" nylon fabric: | | |
| None | control | 600 to 700 |
| Cycloheptadiene | 2.0 | 1,430 |
| 2,2,3,3 tetrafluorocyclobutylvinylethyne | 6.2 | 6,100 |
| Polyethylene terephthalate fabric: | | |
| None | control | 1,400–2,300 |
| 2,2,3,3 tetrafluorocyclobutylvinylethyne | 3.9 | 5,300 |

By the process of this invention, certain fluorine containing compounds are grafted to fabrics of condensation polymer whereby the fabrics are rendered permanently resistant to wetting or soiling with oils, hydrocarbons and other common organic solvents, as well as being water-repellent. This modification is illustrated by the following example.

*Example 26*

A scoured nylon taffeta Sample 26A is soaked for 15 minutes at room temperature in 20 ml. of an 8% diethyl ether solution of alpha, alpha-dihydroperfluorooctyl acrylate, which had been prepared as described in Example 4 of U.S. Patent No. 2,642,416. After soaking for 15 minutes at room temperature, the nylon sample is irradiated, while wet, with 2 mev. electrons for a dosage of 3 mrad. After cooling, another 20 ml. portion of the 8% solution is added, followed by a second irradiation using the same dose; the process is repeated a third time to give a total dosage of 9 mrad. A total of 60 ml. of the 8% solution is used. The sample is then extracted for 24 hours with each of the following solvents: tetrahydrofuran, carbon tetrachloride, perchloroethylene, and dimethylformamide; the sample is then boiled for 8 hours in 0.3% "Tide" solution. After these extractions, the sample is tested for oil repellency using the following test:

Drops of mixtures of a mineral oil (Nujol) and n-heptane are placed on the fabric, and the composition is noted which contains the highest percentage of n-heptane which does not wet the fabric under the drop. The rating corresponding to that composition is considered the oil repellency of the sample.

*Oil repellency rating scale*

| Oil repellency rating: | Percent n-heptane in mineral oil-heptane mixture |
|---|---|
| 100 | 60 |
| 100 | 50 |
| 90 | 40 |
| 80 | 30 |
| 70 | 20 |
| 50 | 0 |
| 0 | (1) |

[1] No holdout to mineral oil.

A rating of 100+ is observed for 26A, vs. a rating of 0 for an untreated control, 26B. When a nylon Sample 26C is treated with the polymer of the above perfluorooctyl acrylate, without irradiation, a rating of 100+ is observed; however, after four 15-min. "Tide" washes (a less severe treatment than given to 26A), the rating drops to 0.

The same modifier is applied to a tow following the procedure detailed in Example 8. A dosage of 3 mrad is applied. The ether solvent is removed prior to irradiation and the tow is given 3 successive soakings and irradiations to build up the modifier. Perchloroethylene is employed as the "wash." Staple cut from the tow is processed in the conventional manner.

The test is repeated, using a fabric of polyethylene terephthalate taffeta, wherein soaking is carried out for 15 minutes at room temperature, followed by slowly raising the temperature to 95° C. in a system sealed to prevent escape of monomer. The material is irradiated at this temperature to a dose of 5 mrad. The process is repeated three times, as before. After extraction for 24 hours using carbon tetrachloride solvent, similar oil repellency is observed.

Grafted fluorocarbon compounds are also useful in imparting resistance to soil, and improving ease of soil removal, as shown by nylon Sample 26D which is soaked in a solution of 20 parts ethyl 2,3,8-trihydroperfluorohepten-2-oate, 20 parts water and 60 parts methanol; and nylon Sample 26E, which is soaked in a 20% solution of perfluoroheptene-1 in ether.

The perfluorohepten-2-oate is prepared as follows, using the synthesis of McBee.

In a 300 ml. three-necked flask fitted with a stirrer, funnel and condenser, 13 grams (0.125 mol) malonic acid is added to 100 ml. pyridine. The mixture is stirred at room temperature while 28 grams of $C_5$ aldehyde in 100 ml. of toluene is added. After completing the addition, the mixture is refluxed for 6 hours, cooled and poured onto 400 grams of ice and 50 ml. of concentrated sulfuric acid. Three layers form; both the lighter and heavier water layers are shown to contain product. They are removed, combined and evaporated under vacuum. The oil is taken up in bicarbonate and ether, washed twice and acidified, and is then shaken with three 300 ml. portions of ether. The ether solution is dried and the ether evaporated to give crude, solid acid. Recrystallized from benzene, white cubic crystals of 3-hydroxyoctafluoroheptanoic acid are obtained, melting at 63–64° C. (weight 21.6 grams, 62.9% yield).

The acid is esterified by refluxing with 20 ml. absolute ethanol and 40 ml. benzene in a flask fitted with a Dean-Stark water trap. One gram of para-toluenesulfonic acid is added. The reaction is completed in 12 hours and the mixture is evaporated in vacuum to remove alcohol and benzene (91% yield).

Crude ester from all sources (56 gm.) is then distilled in a spinning band column to yield 46 grams of product boiling at 130° C., 122 mm.

The hydroxy ester is dehydrated by mixing 11 grams of phosphorus pentoxide with the ester and distilling through a spinning band column at reduced pressure. The ethyl octafluorohepten-2-oate obtained has a boiling point of 92° C., under 28 mm. pressure.

The perfluoroheptene is prepared by a method analogous to that described by La Zerte, Hals, Reid and Smith, Jour. Am. Chem. Soc., 75, 4525 (1953), for the homologous perfluorobutene.

The soaking, irradiation and extraction procedure used for sample 26A is repeated for 26D and 26E. These samples, along with non-irradiated control 26B, are then subjected to a standard laboratory soiling test, with the results shown in Table 20.

TABLE 20

| Sample | 26B (control) | 26D | 26E |
|---|---|---|---|
| Radiation dose, mrad | none | 9.0 | 9.0 |
| Wt. gain, percent | none | 4.3 | 3.0 |
| Reflectance, percent:[1] | | | |
| Wagg oily soil:[2] | | | |
| Before washing | 25.6 | 32.5 | 29.3 |
| After washing | 51.4 | 63.8 | 65.4 |
| Lambert dry soil:[3] | | | |
| Before washing | 33.0 | 39.4 | 35.0 |
| After washing | 86.6 | 92.2 | 90.7 |

[1] Reflectance gives percent of original light reflectance retained after the indicated treatment; all original reflectance measurements taken after two soiling cycles.
[2] Composition and procedure of Wagg oily soil test given in Example 7 and is described by R. E. Wagg, J. Tex. Inst., 1952, T 515; this soil corresponds to soil from the skin, and to extraneous grease and oils.
[3] Composition and procedure of Lambert dry soil given by: H. L. Sanders and J. M. Lambert, J. Am. Oil Chem. Soc., 5, 153-159 (1950) May; this soil corresponds to vacuum-cleaner soils.

Compounds useful in modifying condensation polymer substrates so that they are resistant to oils, oily soil and dry soil are graft copolymers of unsaturated esters having the following general structures:

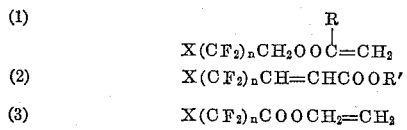

Also useful are unsaturated ethers having the following general structure:

In these general formulas, X may be fluorine or hydrogen (when X is fluorine, the graft copolymer shows a higher degree of hydrophobicity and oleophobicity than when X is hydrogen), $n$ is 3 to 17, and R may be alkyl or hydrogen and R' may be alkyl. The lower alkyl groups are preferred, since long chain alkyls impart oleophilic properties. The grafted fluorine-containing portion of the copolymer should preferably be located on the surface of the structure but may be throughout the body of the base fiber.

The class of compounds which works best is the omega-fluoro type. These are superior to the omega-hydro compounds. It is also preferred for a high degree of oleophobicity that $n$ be at least 7.

*Example 27*

Fabric samples of various yarn description are soaked in a fluorocarbon alcohol, $HCF_2-(CF_2)_5-CH_2OH$. Thereafter they are simultaneously exposed in the equipment and in accordance with the technique of Example 1 to a total radiation dose of 33 mrad. Uncoated comparative controls are irradiated at the same time. Samples of the test, control and original fabrics are given 15 consecutive standard washings. Results of a subsequent test for water repellence are listed below.

TABLE 21

| Fabric | Treated irradiated | Wettability* untreated irradiated | Original |
|---|---|---|---|
| Polyethylene terephthalate, continuous filament | 0.3 | 1.5 | 1.5 |
| Polyethylene terephthalate, staple | 0.3 | 1.5 | 1.5 |
| Polycaproamide, continuous filament | 0.3 | 1.5 | 1.5 |
| 66 nylon, continuous filament | 0.3 | 1.5 | 1.5 |

*Drop diameter in inches after 60 seconds.

*Example 28*

Nylon samples with grafted 4-vinylpyridine are prepared, following the procedure of Example 14. Eamples 28A and 28B have a weight gain, due to grafted 4-vinylpyridine, of 20%.

The polyvinylpyridine graft is quaternized by heating the fabric samples at reflux in 500 ml. of methanol and 50 grams of butyl bromide for 15 hours. The fabric samples are washed twice in hot methanol and once in water at 80° C. to remove any free butyl bromide and methanol. The weight gain after quaternization indicates that approximately 55% of the available pyridine groups have been quaternized. A control sample, 28C, not grafted with 4-vinylpyridine, is subjected to the butyl bromide treatment. In addition, a control sample entirely untreated, number 28D, is subjected to the test. The samples are identified in Table 22.

TABLE 22

Sample No.:         Sample indentification

28A     Nylon with grafted 4-vinylpyridine (4VP), quaternized with butyl bromide.
28B     Nylon with grafted 4VP, not quaternized.
28C     Control nylon treated with butyl bromide.
28D     Control nylon, untreated.

Portions of these samples are tested for biological activity against a *Micrococcus pyogenes* bacterium. Following the procedure described below, it is found that the grafted, quaternized sample, 28A, inhibits bacterial growth in 12 of the 16 samples tested, whereas no inhibition is noted with the various control Samples 28B, C, and D. The results of the tests are listed in Table 23.

TABLE 23—BACTERICIDE TESTS

| Sample | Inhibitory | Non-inhibitory | Questionable results | Total samples tested |
|---|---|---|---|---|
| 28A | 12 | 4 | 0 | 16 |
| 28B | 0 | 7 | 1 | 8 |
| 28C | 0 | 16 | 0 | 16 |
| 28D | 0 | 14 | 0 | 14 |

It is noted that the inhibitory effects of the active graft (Sample 28A) are confined to the fabric itself. Growth occurs around the edges of the fabric, indicating that the active species does not diffuse, but remains attached to the fabric substrate.

The following procedure is used to test the fabric samples: 0.05 ml. of nutrient broth, containing a 1:10 dilution of *Micrococcus pyogenes* var. *aureus* and 0.1% 2,3,5-triphenyl-2H-tetrazolium chloride, is pipetted to strips of fabric 1 x 2.5 cm. The tetrazolium chloride is added as an indicator of bacterial growth, since it is colorless in the oxidized state, but as the bacteria grow, it is reduced and becomes red. Control samples (nutrient broth and tetrazolium chloride, but no bacteria) are also tested.

After the broth dilutions are pipetted to the fabric samples, the samples are placed on sterile nutrient agar plates. Both "sterile" (boiled in methanol) and non-sterile nylon samples are tested. All plates are incubated at 37° C. for 16 to 18 hours, after which they are examined for bacterial growth on the fabric.

When growth is observed on the fabric, the result is recorded as "non-inhibitory." When no growth on the fabric is observed, the result is recorded as "inhibitory."

This example shows that by the process of this invention, bactericidal compounds may be permanently attached to fabric substrates. This is most surprising, since it has always been thought that a bactericide, to be effective must be somewhat soluble in liquid media. The modification produced by the process of this invention, however, remains permanently attached to the fabric, so that it is retained permanently for the life of the fabric, through washing and wearing.

*Example 29*

A swatch of nylon fabric, 7 x 9 inches, is placed in a polyethylene bag containing 80 ml. of 60% N-vinyl-pyrrolidone in water. The bag is sealed, and the fabric is allowed to soak for 10 hours at room temperature. The bag containing the sample is then irradiated, using the Van de Graaff electron accelerator, to give a dose of 1 mrad. After a hold-up time of 1 hour, the fabric sample is removed and non-grafted homopolymer is thoroughly rinsed away using hot distilled water (80° C.). After rinsing, the fabrics are boiled for 30 minutes at 120° C. in a pressure cooker, and dried. The fabric has a weight gain of 45%.

The fabric with grafted polyvinylpyrrolidone is then boiled for 30 minutes in a solution of 1% iodine in methanol, followed by a 5 minute rinse in methanol. An additional weight gain of 8% is noted, due to the formation of an iodine complex with the grafted N-vinylpyrrolidone. Three portions of this fabric are then placed in contact with growing colonies of two fungi, *Chaetomium globosum* and *Aspergillus niger,* and one bacterium, *Micrococcus pyogenes* var. *aureus.* A significant zone of growth inhibition is noted with all three samples. The growth inhibition is significantly greater than that obtained with an original "66" nylon fabric which was merely treated with the methanolic iodine solution.

When the test is repeated, using a fabric of polyethylene terephthalate with grafted N-vinylpyrrolidone, which is subsequently reacted with iodine, similar results are obtained.

Examples 28 and 29 show that according to the process of this invention, condensation polymer substrates can be prepared containing biologically active groups. In general, two broad types of products are shown by these two examples. For instance, Example 28 shows biologically active modifiers permanently attached. Typical compounds are the quaternary compounds prepared from butyl, benzyl and cetyl bromides, and grafts of poly-4- or poly-2-vinylpyridine with condensation polymers. In general, alkyl and/or aromatic quaternary compounds of a vinylpyridine graft on the condensation polymer are suitable. In addition to the vinylpyridines, other monomers may be grafted, which may be thereafter quaternized with alkyl or aromatic bromides to produce a biologically active compound. Suitable monomers are vinyloxyethylamine, triallylamine, and the like. N-vinyl-N-methylformamide may be grafted, and hydrolyzed prior to quaternizing. Other vinyl monomers containing reactive groups such as halogen, nitrile, or isocyanate may be converted to the amine product for quaternization. In fact, any monomer containing a group which is convertible to a quaternizable amine may be employed.

Alternatively, vinyl compounds with preformed quaternary groups may be grafted, to give chains grafted to the condensation polymer. Typical structures are illustrated below:

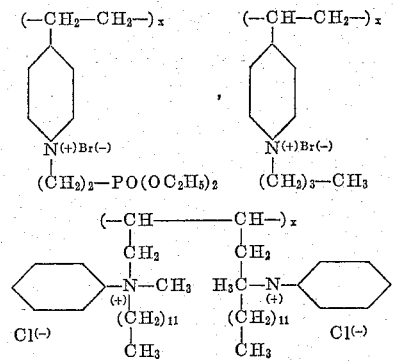

In addition to the above, modifiers bearing biologically active groups which are released slowing are useful. Such modifiers are illustrated by the graft of N-vinylpyrrolidone post-reacted with iodine, as shown in Example 29. Other such compounds are produced by grafting an unsaturated acid, e.g., acrylic acid, and post-reacting with biologically active metal salts to form a grafted salt of acrylic acid such as shown in some of the examples. Suitable metals for forming the salt are mercury, silver, copper and the like.

Extremely small amounts of biologically active compounds are required in order to effectively prevent the growth of bacteria, when these are permanently attached to fiber surfaces. From theoretical considerations, for example, it has been calculated that if all the biological activity is on the fabric surface, merely $10^{-7}$ weight percent is required. In general, it will, of course, be preferred to graft larger amounts of modifier than this. For example, 5–20% is usually suitable, although at times it may be preferred to go as high as 50%. For diffusible biological compounds, it is preferred to graft about 0.5–2% by weight; usually little added advantage will be obtained by grafting more than 50%.

The germicide-grafted fibers illustrated hereinabove are useful for bandaging, as sterile absorbents, and for germ-free linen, masks, curtains, rugs and the like, especially such as would be suitable for use in hospitals, etc. Clothing may be produced which is fungus- and germ-free and incapable of transmitting infection. In addition, development of perspiration odor may be prevented. The products produced by this process are also suitable for non-rotting and mildew-proof outdoor textiles such as fabrics (clothing) for tropical use, sails, awnings, tents, tarpaulins and the like. Many other advantages will be obvious to those skilled in the art.

*Example 30*

The process of this invention is useful in reducing the alkaline sensitivity of polyester fibers and fabrics. Its effect is shown for polyester fabrics grafted with polyacrylonitrile, in Example 7; similar results are obtained when methyl methacrylate is grafted to polyester substrates as shown in this example.

Three samples of tropical worsted fabric prepared from polyethylene terephthalate filaments are immersed in 500 grams of a 50% solution of methyl methacrylate dissolved in propanol, and are heated at 90° C. for 30 minutes. The fabric samples are transferred to stainless steel pans containing 200 ml. of the soaking solution and are then irradiated for a dose of 1 mrad at 90° C., using 2 mev. electrons. The grafted fabric samples are extracted with boiling acetone to remove unreacted monomer and unattached polymer, after which they are dried at 80° C. Treating conditions, weight gains, and alkaline sensitivity of the fabrics are shown in Table 23. The alkaline sensitivity test is the same as that described for Example 7.

TABLE 23

| Sample | Concentration of treating solution, percent | Wt. gain, percent | Alkaline sensitivity |
|---|---|---|---|
| 30A | 20 | 1.5 | 0.74 |
| 30B | 40 | 2.7 | 0.63 |
| 30C | 50 | 3.5 | 0.46 |
| 30D (Control) | None | None | 1.00 |

The procedure is repeated, using a tropical worsted of filaments formed from a copolymer of 98% polyethylene terephthalate and 2% sulfonated polyethylene isophthalate; the fabrics are soaked in a 20% solution of methyl methacrylate dissolved in butanol, followed by the same irradition dose. In this case, a weight gain of 1.1% after extraction, is observed. The alkaline sensitivity is only 0.61, as compared to an unmodified control fabric using the same polymer.

Methacrylate esters are particularly effective in improving resistance to caustic sensitivity, due to their own resistance to caustic hydrolysis. Thus, effective protection is obtained when from 1 to 4% of methyl methacrylate is grafted to polyester substrates. Also effective are the higher alkyl acrylates such as methyl, ethyl, propyl and the like; in general, the lower alkyl esters are preferred.

Acrylate esters are also advantageously grafted to polymeric substrates, and especially after a superficial hydrolytic treatment, provide fabrics of improved dyeability and resistance to soil. This embodiment is illustrated by the following example.

*Example 31*

A fabric swatch of polyethylene terephthalate tropical worsted (prepared from staple) is immersed in 150 grams of a 50% solution of methyl acrylate in propanol, and is heated at 90° C. for 30 minutes. The fabric is transferred to a stainless steel pan containing 200 ml. of the above methyl acrylate solution, and is then irradiated at 90° C. for a dose of 1 mrad. The grafted fabric, number 31A, is extracted in boiling methanol for 2 hours to remove unreacted monomer and ungrafted polymer, after which it is dried at 80° C. A weight gain of 4.6% is observed. The sample is then superficially hydrolyzed by boiling for 1 hour in 1% sodium hydroxide solution.

Three denier per filament polyethylene terephthalate tow is soaked in methyl acrylate at 90° C. for 30 minutes. The tow is then irradiated without squeezing off excess liquid at 90° C. at a rate to provide dosage of 1 mrad. Boiling methanol is employed as the "wash" to remove unreacted monomer. Staple is cut from the tow. The structure can be hydrolyzed at any time after irradiation.

Following the above procedure, Samples 31B and 31C of polyethylene terephthalate fabric are prepared to contain 5 and 10% respectively of grafted methyl acrylate. The samples are superficially hydrolyzed by boiling in 1% sodium hydroxide as before. The treatment results in hydrolysis of the surface layers of grafted methyl acrylate, producing a residue of acrylic acid groups attached to the fabric substrate, in addition to some non-hydrolyzed methyl acrylate. The caustic treatment simultaneously forms the sodium salt of the grafted acid. When this product is tested for wickability, the rate of disappearance of a drop is much more rapid in the case of Samples 31B and 31C (less than 1 second) than it is for control Sample 31D (19 seconds) which has not been modified except for the caustic boil-off. In addition, a laboratory laundry soil test (described in Example 7) shows a value of 17 for control versus 7 and 6 for the two modified fabrics, indicating a substantial improvement in rate of soil removal.

In addition to the above advantages, the dyeing rate with disperse dyes (test procedure in Example 8) is significantly increased for 31B and 31C.

Using procedures similar to those described above, nylon fabric Sample 31D and polyethylene terephthalate fabric 31E are grafted with methyl acrylate.

Samples 31D and E and also corresponding control Samples 31F and G (without grafted methyl acrylate) are subjected to a 1 hour hydrolysis treatment at the boil, as indicated in Table 24, using 0.1 normal or 5% sodium hydroxide solution. After the hydrolysis treatment, the fabrics are washed, rinsed in distilled water, dried and the log R determined; the results are shown in Table 24. Swatches of the test and control fabrics are dyed with a basic dye,

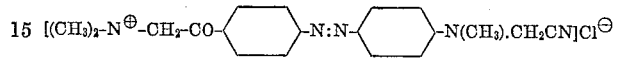

with the results also indicated in the table. These results show that the caustic treated samples dye to much deeper shades than the untreated ones.

TABLE 24

| Sample | Fabric | Test after hydrolysis | | |
|---|---|---|---|---|
| | | In 0.1 N NaOH | | In 5% NaOH |
| | | Log R | Dye | |
| 31D | Nylon + MA[1] | 8.9 | Orange | Red. |
| 31E | Polyethylene terephthalate + MA | 11.3 | do | Orange. |
| 31F | Polyethylene terephthalate (control) | >13.3 | Yellow | Yellow. |
| 31G | Nylon (control) | >13.3 | do | Do. |

[1] MA = methyl acrylate.

An examination of the cross-section of fibers from Sample 31E showed a penetration of 3.2 microns out of a total diameter of 18.2 microns. This indicates that the methyl acrylate penetrated into the fiber before grafting.

The process of this example is repeated, using a sample of undrawn yarn 31H, prepared from polybis(1,4-dimethylol) cyclohexane terephthalate. Skeins of this yarn are soaked in a 50:1 (wt./wt.) bath of 50% methyl acrylate in butanol at 90° C. for 30 minutes, and are then irradiated for 1 mrad in the padding solution using a Van de Graaff electron accelerator. After washing and extraction with acetone, followed by drying, a weight gain of 8.0% is noted. This product has improved dyeability, wet crease recovery, and the like, such as observed with fabrics from polyethylene terephthalate.

At a loading of 5% (weight gain), methyl acrylate accelerates the dye rate of polyethylene terephthalate at least by a factor of 2, and gives a deeper shade. Thus this modified polyethylene terephthalate is dyeable at the boil with dispersed dyes, while still retaining hydrolytic stability and strength equivalent to that of the unmodified control fiber. Somewhat less effective results are obtained when ethyl acrylate is used instead of methyl acrylate, believed to be due to decreased fiber penetration. In general, it is preferred to use low molecular weight (especially lower alkyl) monomers in order to facilitate penetration. The improvement obtained by the methyl acrylate graft is sufficient to permit atmospheric pressure dyeing comparable to that attained with carrier- or pressure-dyed control polyethylene terephthalate.

The important feature of the embodiment shown in this example is to use an acrylate monomer that may be hydrolyzed to provide a useful number of carboxyl groups. Higher alkyl acrylates as well as methacrylate esters are less effective due to their resistance to hydrolysis. However, alkyl ether acrylates are advantageously grafted to polyester substrates as shown hereinafter.

The procedure for Sample 31E is repeated, using polyethylene terephthalate fabric 31I, and substituting Cellosolve acrylate ($C_2H_5$—O—$CH_2CH_2$—OOC—CH=$CH_2$) for methyl acrylate, as a 5% aqueous emulsion; the irradiation dose is 1 mrad. The fabric is scoured in boiling acetone for 15 minutes to remove monomer and ungrafted polymer, scoured in 1% "Tide" solution for 15 minutes, and rinsed again in boiling acetone for 15 minutes. The weight gain is 2%.

Competitive dyeings of 100% polyethylene terephthalate fabric and the same fabric with a graft of 2% Cellosolve acrylate show that the grafted fabric is more deeply dyed than the control, using a dye bath containing 2% (on weight of fabric) of blue dispersed dye of Example 8. The crease recovery of the test fabric is found to be 83% versus 78% for the untreated control.

A fabric, 31J prepared from polyethylene terephthalate modified with 2% sulfonated polyethylene isophthalate is grafted with 6% Cellosolve acrylate, following the above procedure. It is then dyed at the boil with a dye bath containing 1% (on weight of fabric) of Sevron Blue 5G (C.I. Basic Blue 22). The fabric dyes to a deep blue shade. Under the same dyeing conditions, an ungrafted sample of the same fabric acquires only a medium shade of blue. The crease recovery of the treated fabric is 69%, versus 61% for the untreated control, indicating improved wash-wear properties.

For dyeability at the boil, the preferred amount of grafted Cellosolve acrylate is in the range of 6–10%; a range of 1–10% produces useful improvements in crease recovery. Fabrics grafted with more than 10% of this acrylate usually have a waxy hand.

For useful improvements in dyeability, it is important that the grafted modifier penetrate into the fiber prior to the grafting operation. This is most readily accomplished by the use of low molecular weight acrylates such as Cellosolve acrylate.

Useful antistatic effects are obtained by grafting higher molecular weight acrylates, e.g., those containing more ethyleneoxy groups, to condensation polymer substrates. Such combination is illustrated by Example 1, wherein methoxydecaethyleneoxy methacrylate is grafted to nylon substrates.

The process of this invention is useful for chemically grafting modifiers to the surface of substrates prepared from condensation polymers. The application and grafting of these polymeric modifiers is conveniently done upon the filaments, staple, or upon fabrics woven from said filaments. The most useful effects are produced when a thin, uniform coating of the polymeric modifier is applied to all the filaments. For apparel textiles, heavy deposits of coatings are usually to be avoided, since it has been found that upon irradiation said heavy coatings often result in a fabric that is stiff and boardy in character. Thus, it is preferred to limit the amount of modifier applied so that the stiffness of the fabric will not be increased more than about 50%, as compared to the original untreated fabric. Thus, drape, hand and other aesthetic properties of the original textile is retained.

To attain this uniform, controlled application of polymeric modifiers, it is desirable to apply said modifiers either as a solution, an emulsion, or, if of sufficiently low molecular weight to have ready flowability, as a melt. A method of application is illustrated by the following example.

Example 32

Methoxydecaethyleneoxy methacrylate polymer is prepared by heating 99.5 parts of the monomer with 0.5 part of benzoyl peroxide on a steam bath at 100° C. for 1 hour. A gel-like polymer forms. A sample of a "66" nylon fabric (Sample 32A) is immersed in a solution-dispersion of the gel-like polymer in water. The sample is then exposed to irradiation with the equipment and in accordance with the technique of Example 1. Two control samples are employed. Sample 32B is immersed in the methoxydecaethyleneoxy methacrylate monomer while Sample 32C is not coated prior to irradiation. Each sample is exposed to radiation dose of 33 mrad. After consecutive standard washing and drying the antistatic properties (log resistivity) of each sample is observed. The observations are reported in Table 25.

TABLE 25

| Sample | Log resistivity | |
|---|---|---|
| | 1 washing | 15 washings |
| 32A | 9.3 | 10.0 |
| 32B | 9.5 | 9.9 |
| 32C | 13.2 | 13.3 |

It is apparent from the above that both monomer and polymer are effective in providing antistatic protection.

When a sample of the fabric is coated directly with the gel-like polymer and irradiated, a waxy, flaky deposit is obtained which is neither uniform nor permanent to washing and handling. The stiff, harsh hand renders it unsuitable for usual apparel use.

Example 33

Various fabrics, coated by immersion and uncoated, as indicated, are irradiated as described hereinbefore to the dosages reported with resulting log resistivity after 15 consecutive standard washings as noted.

TABLE 26

| Fabric | Modifier | Radiation dose, mrad | Log resistivity |
|---|---|---|---|
| 33A D¹ (cont. fil.) | None | None | 13.1 |
| 33B D¹ (cont. fil.) | do | 40 | 13.2 |
| 33C D¹ (cont. fil.) | A⁴ | 40 | 10.2 |
| 33D D¹ (cont. fil.) | A | 20 | 10.9 |
| 33E D¹ (cont. fil.) | B⁵ | 40 | 9.7 |
| 33F D¹ (staple) | None | None | 13.3 |
| 33G D¹ (staple) | do | 40 | 13.3 |
| 33H D¹ (staple) | A | 40 | 9.3 |
| 33I D¹ (staple) | A | 20 | 10.2 |
| 33J D¹ (staple) | B | 40 | 9.2 |
| 33K 66N² (staple) | None | None | 13.3 |
| 33L 66N² (staple) | do | 40 | 13.4 |
| 33M 66N² (staple) | A | 40 | 9.6 |
| 33N 66N² (staple) | A | 20 | 10.8 |
| 33O 66N² (staple) | B | 40 | 9.3 |
| 33P 6N³ (staple) | None | None | 13.4 |
| 33Q 6N³ (staple) | do | 40 | 13.3 |
| 33R 6N³ (staple) | A | 40 | 9.6 |
| 33S 6N³ (staple) | A | 20 | 10.2 |
| 33T 6N³ (cont. fil.) | None | None | 13.2 |
| 33U 6N³ (cont. fil.) | B | 40 | 9.7 |

¹ "D" is polyethylene terephthalate.
² "66N" is polyhexamethylene adipamide.
³ "6N" is polycaproamide.
⁴ "A" is liquid methoxydecaethyleneoxy methacrylate.
⁵ "B" is a mixture of 16 parts of polyoxyethylene glycol of 20,000 mol. wt. ("Carbowax" 20,000) and 84 parts of water.

Antistatic properties are induced in all the modified fabric as noted. Use of the high molecular weight glycol as an aqueous solution prevents deposition of heavy coatings of polymeric material which would give a harsh hand to the fabric.

Sample 33D shows improved ease of removing oily soil (test procedure in Example 7); the difference between initial light reflectance and reflectance of 33D after standard soiling and washing is 1.1, as compared to a difference of 5 units for control 33A. Sample 33D is more dyeable than 33A, with dispersed dyes (test procedure in Example 8).

Example 34

Transparent polyethylene terephthalate film of 10 mil thickness is dipped into water containing 3% by weight of methoxydodecaethyleneoxy methacrylate. It is irradiated wet, as in Example 1, to a total of 20 mrads. The resulting film has improved antistatic properties (log R 10.6–11.5 vs. 13.1 for control) and is modified uniformly over the whole surface.

In Example 35 below, a polyurethane foam is modified by the process of the present invention. The preparation of polyurethane foam from a liquid foam-forming mixture of water and free isocyanate radical-containing polyurethane products resulting from the reaction (1) an alkyd or other active hydrogen-containing organic polymeric material and (2) organic compounds containing, as the sole reacting groups, a plurality of isocyanate groups, is described in "German Plastics Practice," by De Bell et al., 1946, pp. 316 and 463–465.

*Example 35*

A fine-pore, ester-type polyurethane foam is produced by mixing 23.3 grams of toluene diisocyanate containing 80% toluene-2,4-diisocyanate and 20% toluene-2,6-diisocyanate into a composition of the following:

| | Grams |
|---|---|
| Polyester resin | 70.0 |
| Polyoxyethylated vegetable oil | 0.7 |
| N-coco-morpholine | 0.79 |
| Water | 1.7 |
| Diatomaceous silica—average particle size 7–9 microns | 2.0 |
| Benzidine yellow pigment | 0.1 |

The "polyester resin" is the reaction product of diethylene glycol, adipic acid, and trimethylolpropane in a 13/13/1 molar ratio. Its physical properties are:

| | |
|---|---|
| Viscosity cps. | 16,000 |
| Acid No. | 2.02 |
| Specific gravity | 1.194 |
| Percent water | 0.17 |
| Hydroxyl No. | 66.8 |

After a holdup time of approximately 10 seconds, the mixture is placed in a mold where foaming occurs in about 30 seconds, being complete in about 3 to 4 minutes. The product is cured for about 8 hours at room temperature.

Samples of the fine-pore, ester-type polyurethane foam prepared as described above, are weighed, and then subjected to mechanical working to improve porosity (by pounding under water). They are next thoroughly soaked in a 15% by weight aqueous solution of a high molecular weight poly(ethylene oxide), "Carbowax" 20,000. Some of the samples are placed in polyethylene bags and irradiated at doses of 1 to 10 mrad using the 2 mev. Van de Graaff accelerator. The sponges are washed overnight in cold water, and are then dried to constant weight. As noted in Table 27, all initially have excellent wickability (i.e., they very rapidly became water-soaked upon touching one edge to the surface of the water) but only in the case of the Sample 35D does the property survive extensive washing. After washing, the samples are dried to constant weight. It is found that sample 35D has increased in weight by 40% over its initial weight. The sample has excellent hydrophilic properties upon re-wetting. Untreated samples of the foam show poor wickability.

TABLE 27

| Examples | Dose, mrad | Wt. gain, percent | Wicking properties |
|---|---|---|---|
| 35A | 1 | <5 | Excellent—Wickability rapidly lost. |
| 35B | 2 | <5 | Do. |
| 35C | 5 | <5 | Excellent—Fair retention of wickability. |
| 35D | 10 | 40 | Excellent—Excellent retention of wickability. Sponge washed overnight before drying and weighing. |

The slow dissolution of the coatings formed by low doses has the effect of gradually releasing some of the surface-active "Carbowax." For some uses, this is advantageous, for example, in the commercial product designed for washing. However, the dose should initiate sufficient cross linking and grafting to render the sponge hydrophilic for a reasonable length of time.

It should be noted that the modification of the foam throughout its bulk, without destroying its softness and its ability to retain water, is made possible by use of a low viscosity treating solution which carries the modifier to all internal and external surfaces without producing excessively thick deposits.

*Example 36*

A sample of "66" nylon fabric is immersed in a solution of 10 parts acrylamide and 90 parts water. It is then irradiated using the Van de Graaff electron accelerator, operated as described above, to a total dose of 40 mrad. After 15 standard washings, the dried fabric of the present invention retains a much stiffer hand than an uncoated, irradiated comparative control. Furthermore, the acrylamide-grafted nylon is more hydrophilic than non-grafted control samples and has a significantly higher wickability. Thus when samples of the acrylamide-gafted fabric of this example are boiled for 30 minutes in a bath having the composition (based on a fabric weight of 1 gram):

50 ml. water
0.1 gram of Perlon Fast Red 3 BS*
0.02 gram of Triton X 100**
0.02 gram of ammonium hydroxide

*The cobalt dye of Example III of German Pat. 743,155 (1943).
**Octyl phenyl polyether alcohol sold by Rohm and Haas Corp. of Philadelphia, Pa.

the acrylamide-grafted nylon dyes rapidly to a deep shade whereas neither the original nylon nor irradiated (40 mrad) nylon can be dyed as effectively under the same conditions using this bath.

Cross-sections of filaments removed from the dyed test fabric are deeply dyed throughout the entire cross-section, showing that the acrylamide has penetrated throughout the fiber prior to grafting.

*Example 37*

A sample of "66" nylon fabric is immersed in a mixture of 30 parts maleic anhydride, 70 parts of methoxydecaethyleneoxy methacrylate monomer and 110 parts water. It is irradiated to a total dosage of 20 mrad using the Van de Graaff electron accelerator, as described hereinabove. The fabric is then subjected to 15 standard washings, followed by rinsing in hard (calcium ion containing) tap water. It is observed to have a much dryer hand than an irradiated comparative control which is not immersed in the liquid mixture prior to irradiation. Hot ashes from a burning cigarette are flicked onto the liquid-immersed, irradiated, washed fabric to determine its "hole-melting" tendency. Only a small brown stain results. Holes are immediately melted through the untreated fabric, whether irradiated or not. When dyed in the basic dye bath of Example 16, filaments of the dyed fabric show deep dyeing throughout the fiber cross section, showing that the modifier penetrated throughout each filament.

*Example 38*

A series of fabric and yarn samples are prepared from the polymers listed in Table 28 and treated as shown in Table 29.

TABLE 28

| Sample | Polymer | Form tested |
|---|---|---|
| 38A, 38B | Polyamide from metaxylylene diamine and adipic acid. | Fabric. |
| 38C, 38D | Polyurethane from piperazine and ethylene glycol chloroformate. | Do. |
| 38E, 38F | Poly (ether-urethane) elastomer. | Yarn. |
| 38G, 38H | Polyamide from 2-methyl hexamethylene diamine and oxalic acid. | Fabric. |
| 38I, 38J | Polyamide from m-phenylene diamine and isophthalic acid. | Do. |
| 38K, 38L | Polyoxymethylene from condensation of formaldehyde. | Do. |
| 38M, 38N | Polyester from ethylene glycol and terephthalic acid. | Do. |
| 38O, 38P | Same as 38M, 38N. | Do. |
| 38Q, 38R | Copolyester from ethylene glycol and terephthalic and sebacic acids, acid ratio 90:10. | |

The poly(ether-urethane) referred to above is prepared by reacting poly(tetramethylene oxide) glycol (124.5 grams=0.12 mol) having a molecular weight of 1,035 with 10.50 grams (0.06 mol) of 4-methyl-m-phenylene diisocyanate with stirring in an anhydrous atmosphere for 3 hours at steam bath temperatures. To this "dimer" with hydroxyl ends is added without cooling 30.0 grams (0.12 mol) of methylene bis(4-phenylisocyanate) dissolved in dry methylene chloride and the mixture is allowed to react for one hour at steam bath temperatures. The "dimer" with isocyanate ends is allowed to cool and 400 grams of N,N-dimethylformamide is added. To this solution is added 3.0 grams (0.06 mol) of hydrazine hydrate dissolved in 26 grams of N,N-dimethylformamide. The resulting polymer solution, which contained 28% solids, is dry spun in the usual manner to form elastic filaments.

Samples 38K and 38L are knitted fabrics from filaments of the polyoxymethylene described and claimed by R. N. MacDonald in U.S. Patent 2,768,994.

TABLE 29.—TREATMENT CONDITIONS

| Sample | Treating soln., parts by wt. | Soaking time, temperature, °C. | Irradiation dose, mrad | Wt. gain, percent | Acid gr./10⁶ gm. |
|---|---|---|---|---|---|
| 38A | 20 AA,¹ 80 H₂O | 60 min., 25° | 1 | 9.6 | 1,200 |
| 38B (Control) | 20 AA,¹ 80 H₂O | 60 min., 25° | none | none | 40 |
| 38C | 20 AA,¹ 80 H₂O | 60 min., 25° | 1 | 30 | 3,200 |
| 38D (Control) | 20 AA,¹ 80 H₂O | 60 min., 25° | none | none | none |
| 38E | 20 AA,¹ 80 H₂O | 60 min., 25° | 1 | 12.6 | 1,554 |
| 38F (Control) | 20 AA,¹ 80 H₂O | 60 min., 25° | none | none | none |
| 38G | 20 AA,¹ 80 H₂O | 60 min., 60° | 1 | 9.5 | 1,200 |
| 38H (Control) | 20 AA,¹ 80 H₂O | 60 min., 60° | none | none | 25 |
| 38I | 50 AA, 50 DMF ² | {16 hrs., 25°, 20 min., 90°} | 25 | 3.5 | 440 |
| 38J (Control) | 50 AA, 50 DMF ² | {16 hrs., 25°, 20 min., 90°} | none | none | ³ N.D. |
| 38K | 12 AA, 40 DMF, 48 H₂O | 30 min., 90° | 2 | 1.2 | N.D. |
| 38L (Control) | 12 AA, 40 DMF, 48 H₂O | 30 min., 90° | none | wt. loss | N.D. |
| 38M | 20 AA, 10 SSS,⁴ 70 H₂O | 30 min., 90° | 1 | 7.2 | N.D. |
| 38N (Control) | 20 AA, 10 SSS,⁴ 70 H₂O | 30 min., 90° | none | N.D. | N.D. |
| 38O | 20 AA, 80 H₂O | 30 min., 90° | 1 | 4.0 | N.D. |
| 38P (Control) | 20 AA, 80 H₂O | 30 min., 90° | none | N.D. | N.D. |
| 38Q | 20 AA, 80 H₂O | 60 min., 90° | 1 | 4.0 | N.D. |
| 38R (Control) | 20 AA, 80 H₂O | 60 min., 90° | none | N.D. | N.D. |

¹ AA means acrylic acid.
² DMF means dimethyl formamide.
³ ND means these values were not determined.
⁴ SSS indicates a purified sodium styrene sulfonate.

Following the indicated soaking treatment, the samples are irradiated with 2 mev. electrons at the soaking temperature, using the indicated dose. Suitable controls are similarly treated, but are not exposed to irradiation. Following the irradiation procedure, the samples are washed to remove ungrafted acid, and the weight gain is determined. Portions of each of the modified samples are treated to form the salt. The sodium salt modification is prepared by heating the fabric at 70° C. for ½ hour in a 1% sodium carbonate solution, and the calcium salt modification is prepared from the sodium salt modification by heating in calcium chloride solution. The properties of the two salt-modified samples are indicated in Table 30.

TABLE 30.—MODIFICATIONS PRODUCED

| Sample | Log R at 55% RH | | | Fiber melt temperature, °C. | | |
|---|---|---|---|---|---|---|
| | Control | Na | Ca | Control | Na | Ca |
| 38A | | 9.6 | | | 364 | |
| 38B | >13.3 | | | 216 | | |
| 38C | | <7.6 | >13.3 | | 416 | |
| 38D | >13.3 | | | 236 | | |
| 38E | | | | | | 334 |
| 38F | | | | 260 | | |
| 38G | | 9.5 | | | 328 | |
| 38H | >13.3 | | | 230 | | |
| 38I | | 9.1 | | | | |
| 38J | >13.3 | | | | | |
| 38K | | 8.7 | | | | |
| 38L | >13.3 | | | | | |
| 38M | | 8.8 | | | | |
| 38N | 13.3 | | | | | |
| 38O | | 10.5 | | | | |
| 38P | >13.3 | | | | | |
| 38Q | | 9.9 | | | | |
| 38R | >13.3 | | | | | |

In addition to the properties indicated, Samples 38A, 38G in the acid form showed improved resistance to wrinkling and mussing while wet.

The modified poly(ether-urethane) product of this invention is also useful in preparing the non-woven paper-like material described in U.S. application S.N. 635,731. Examples 39 and 40 illustrate such preparations. In these examples, strengths of the sheets of paper-like product are determined by depositing the fibers on 100 mesh screen, washing the sheets obtained with approximately 6 liters of water and immediately rolling them off the screen by the couching technique familiar to the paper industry. The sheet is then dried at 120° C. (or, if necessary, at a temperature below the fusion temperature of the polymer) for 2 hours. After cooling, ½ inch strips are cut from the sheet and dry tensile strength is measured on an Instron tester. Tongue tear strength is determined in accordance with ASTM D-39.

*Example 39*

A poly(ether-urethane) is prepared, following the procedure for the polymer of samples 38C, 38D of Example 38. The polymer solution as prepared in Example 38 is diluted from 28% to approximately 10% solids content, and 100 grams is placed in a separatory funnel from which it is allowed to trickle slowly into approximately 400 ml. of glycerol in a 1 quart Waring Blendor operating at 14,000 r.p.m.

A mass of fibrous material is produced, as described and claimed in U.S. patent application S.N. 635,731. The components of the mass have been termed fibrids, and will so be referred to hereinafter.

Twenty-three grams of the fibrids so obtained are deposited on a 100 mesh screen to form a control sheet, which is then washed three times with distilled water. Another 23 grams of the fibrids (based on dry weight) are dispersed in 93 grams of water, and this mixture is placed in a 1 gallon polyethylene bag containing 75 ml. of acrylic acid and 180 ml. of water. The mixture is allowed to soak for 2 hours, and is then irradiated (in the bag) for a dose of 1 mrad. After irradiation, the modified fibrids are washed several times with 70° C. distilled water, to remove excess homopolymerized acid. The modified fibrids are then deposited on 100 mesh screen to form a sheet, which is removed and dried. The sheet has good drape and liveliness. The sheet prepared in this manner has a tongue tear strength of $0.122/in./oz./yd.^2$ as compared with 0.087 for the control.

*Example 40*

Five grams of the dried unmodified fibrids in sheet form, as prepared in the above example, are soaked for 1 hour in 15 ml. of polymerization-inhibited acrylic acid and 135 ml. of water at room temperature, followed by irradiation in the acrylic acid solution, with a dose of 1 mrad. After the irradiation-grafting step, the resulting modified fibrid is washed four times in hot distilled water at 80° C. The weight gain is 11.9%. A sheet is formed from the fibrid suspension by depositing the fibrids on a 100 mesh screen, followed by washing and drying. The tongue tear strength of the sheet is $0.1/oz./yd.^2$, as compared to $0.087/oz./yd.^2$ for the unmodified control; the tensile strength is likewise increased by the acid modification from 1.23 to $1.35 lbs./in./oz./yd.^2$. When the modified dried fibrid sheet is treated in sodium carbonate solution to form the sodium salt, the tongue tear strength is increased to 0.116. The divalent ion modification (such as calcium) increases the tear strength to an even greater degree than the sodium form.

*Example 41*

Yarn is prepared from polysulfonamide polymer, produced by the condensation of bis(p-aminocyclohexyl)-methane and 4,4'-diphenyldisulfonyl chloride. A small skein of the said yarn (2.3 grams) is soaked for 4 hours in 50 ml. of 25% aqueous acrylic acid at room temperature. The excess solution is removed by decantation, and the moist skein is irradiated with electrons to a dose of 2 mrad, using the Van de Graaff accelerator. The irradiated sample is extracted several times with hot water, to remove ungrafted homopolymer; after drying, the sample shows a weight gain of 15.2%. The polysulfonamide yarn with acid grafted thereto attains a deep shade when dyed with a basic dye, whereas an unmodified control acquires only a very light shade with the same dye.

*Example 42*

Fabric samples of "66" nylon (coded N) and polyethylene terephthalate (coded D) are treated with the glycols listed below and irradiated with high energy electrons, as described previously. The radiation dose in each case is 40 mrad.

TABLE 31

| Sample | M.W.[1] | M.W.-PEG[2] | Trade name | Glycol: Water |
|---|---|---|---|---|
| 42A-N | 600 | 600 | "Carbowax"[3] | 100:0 |
| 42B-N | 1,000 | 1,000 | do | 30:70 |
| 42C-D | 1,000 | 1,000 | do | 8:92 |
| 42D-D | 4,000 | 4,000 | do | 8:92 |
| 42E-N | 6,000 | 6,000 | do | 30:70 |
| 42F-D | 6,000 | 6,000 | do | 8:92 |
| 42G-N | 20,000 | 20,000 | do | 8:92 |
| 42H-D | 20,000 | 20,000 | do | 16:84 |
| 42I-D | 5,000 | 2,000 | "Tetronic"[4] | 8:92 |
| 42J-D | 11,000 | 8,000 | do | 8:92 |
| 42K-D | 27,000 | 22,000 | do | 8:92 |
| 42L-N | Control | | | |
| 42M-D | Control | | | |

[1] Molecular weight of the compound grafted.
[2] Molecular weight of the polyoxyethylene portion of the compound grafted.
[3] Trade name of polyethylene glycols sold by the Carbide and Carbon Chemicals Co., N.Y.
[4] Trade name for block copolymers based on indicated ratios of polyethylene glycol and polypropylene glycol, built on ethylene diamine; sold by Wyandotte Chemicals Corp., Wyandotte, Mich.

After irradiation, the samples are subjected to a series of standard washings, and are then tested for anti-static effect. The results of these tests are listed in Table 32.

TABLE 32

| Sample | Log R | | | Other effects obtained |
|---|---|---|---|---|
| | 1 wash | 8 wash | 15 wash | |
| 42A-N | 11.3 | 13.2 | | |
| 42B-N | 11.3 | 13.3 | | |
| 42C-D | 13.3 | | | |
| 42D-D | 10.2 | | 11.8 | |
| 42E-N | 8.2 | 8.2 | 9.2 | |
| 42F-D | 10.0 | | 10.6 | Improved disperse dyeability. |
| 42G-N | 7.9 | 8.4 | 9.6 | Do. |
| 42H-D | 9.8 | | 10.7 | Do. |
| 42I-D | 13.3 | | | |
| 42J-D | 10.0 | | 10.7 | Do. |
| 42K-D | 9.8 | | 10.5 | Do. |
| 42L-N | 13.3 | | | |
| 42M-D | 13.3 | 13.3 | 13.3 | |

Blanks in the table indicate properties not determined.

In addition to improved resistance to static, improved dyeability with disperse dyes at the boil is noted, without the need for a carrier. Test procedure is shown in Example 8.

Other glycols and related oxygen containing compounds are useful in modifying the properties of fabrics from condensation polymers, as is shown by the following example.

*Example 43*

Samples of polyethylene terephthalate taffeta coded 43A to 43H inclusive are soaked in solutions of the reagents indicated in Table 33. Except as otherwise indicated, 8% aqueous solutions are used. The samples are then irradiated; in some cases, the samples are dried prior to irradiation. The irradiation is carried out with a 2 mev. Van de Graaff electron accelerator, as in previous examples. The dose, except for 43E, is 40 mrad. An irradiated control sample, 43I, is also prepared.

TABLE 33

| Sample No. | Reagent | Avg. M.W. | Concn. Percent | Condition [1] |
|---|---|---|---|---|
| 43A | Polytetramethylene ether glycol | 3,000 | 8 | Dry. |
| 43B | Polyvinyl alcohol (viscosity 30 cps.) | | 8 | Wet. |
| 43C | Copolymer of diethylaminoethyl methacrylate and glycidyl methacrylate. | | 8 | Do. |
| 43D | Poly(propylene oxide) glycol | 2,025 | 8 | Dry. |
| 43E | Cellulose acetate | 45,000 to 100,000 | 2 8 | Do. |
| 43F | Diaminopropylpolypropylene glycol | 2,100 to 2,200 | 8 | Do. |
| 43G | Copolymer of ethylene glycol methacrylate and 2,3 epoxypropyl methacrylate. | | 8 | Wet. |
| 43H | Polyethylene sorbitan monooleate | | 8 | Do. |
| 43I [3] | None | | | Dry. |

[1] Condition of sample during irradiation.
[2] Acetone solvent, dose 20 mrad.
[3] Irradiated control.

Following the irradiation treatment, the samples are subjected to a series of standard washings and are then tested, with the results listed in Table 34.

TABLE 34

| Sample No. | Log R [1] | Wetting time, min.[2] | Other Effects Obtained |
|---|---|---|---|
| 43A | >13.0 | 5 to 15 | Improved disperse dyeability. |
| 43B | >15 | 2 | Do. |
| 43C | 14.1 | 5 to 15 | Improved disperse and basic dyeability. |
| 43D | 14.4 | 1 | Decreased viscosity change. |
| 43E | >15 | 1 | |
| 43F | 11.8 | 5 to 15 | Improved disperse dyeability. |
| 43G | 11.9 | 1 | |
| 43H | 13.9 | 2 | |
| 43I | >15 | 5 to 15 | |

[1] Log R after 5 standard washings.
[2] Wetting time = time required for a drop of water to be absorbed by the fabric.

Disperse dyeability is determined by dyeing for 90 minutes at the boil in an aqueous bath containing 2% of the blue dye of Example 8, and 0.5% sodium hexametaphosphate. A 40:1 bath-to-fabric ratio is employed. Basic dyeability is determined as in Example 33.

The process of this invention is often advantageously carried out by irradiating at elevated temperatures. This is particularly effective when non-polymerizable modifiers are to be grafted to condensation polymer substrates. These advantages are illustrated by the following example.

*Example 44*

In the test shown in Table 35 films of the indicated polymers are coated with solutions of selected $C^{14}$-tagged reactants having an activity of 0.1 millicurie per gram. After evaporation of the solvent, the coated films are placed in an aluminum box with a top window of polyethylene terephthalate film 0.00025 inch thick. An atmosphere of flowing nitrogen is maintained in the box during irradiation. Each film is exposed to a dose of 500 watt-sec./cm.$^2$ of 2 mev. electrons (40 mrad absorbed dose). Temperatures are controlled as shown, by means of cooling baths or external heating; the irradiation dose rate is also controlled to maintain the temperature within the specified range. After irradiation, the samples are extracted in a Soxhlet extractor with the indicated solvent, until retained activity is constant, as indicated by an end-window Geiger counter (Tracerlab Superscaler).

The retained activity value shown in Table 35 (in units of counts/min./2.5 cm.$^2$) represents the difference between the total count above background of the treated sample and the count of a control treated identically, but omitting the irradiation step.

TABLE 35

| Sample | Polymer substrate | Coating material | Extractant | Retained activity after irradiation at— | | | | | |
|---|---|---|---|---|---|---|---|---|---|
| | | | | −73° C. | 0° C. | 37–56° C. | 60–100° C. | 100–121° C. | 150–170° C. |
| 44A | 66 nylon | Glycerol-1-$C^{14}$ | Water | 8 | 11 | 25 | 43 | 129 | 119 |
| 44B | Polyethylene terephthalate | do | do | | | | 0 | 70 | 31 |
| 44C | do | Palmitic acid-1-$C^{14}$ | Ether | | | 2 | | 102 | 88 |
| 44D | Poly(m-phenylene isophthalamide). | Glycerol-1-$C^{14}$ | Water | | | | 1 | 5 | 42 |
| 44E | do | Palmitic acid-1-$C^{14}$ | Ether | | | | 4 | 2 | 3 | 35 |

These data illustrate the substantial increase in the amount of grafting of the test coating when the temperature of irradiation is above about 100° C., and preferably between 100 and 160° C. This effect is obviously most useful on polymer substrates having a crystalline melting point above 160° C. While optimum grafting efficiency is obtained by carrying out the irradiation step at a temperature of at least 100° C. and frequently preferably higher (but not exceeding the melting point of the substrate polymer), moderately improved grafting efficiency may also be obtained either by preheating the coated substrate at 100–160° C. prior to irradiation or by similarly heating the coated substrate immediately after irradiation.

While applicants do not wish to be bound by any particular theory, it has been hypothesized that this behavior may be related in some way to the second order transition point of the polymer in question; soaking and penetration of reagents, and also frequently the irradiation step, are often advantageously carried out above this temperature.

*Example 45*

It is often desirable to treat condensation polymer substrates with water prior to or during grafting; this seems to have an accelerating effect on irradiation grafting reactions. The water may be used as an aqueous solution of the modifying agent in which the substrate is soaked or it may be applied after the substrate has been coated with modifier. This latter process is illustrated by the following example.

A 0.001 inch thick film of polyethylene terephthalate is wet with a 1.2% ethanol solution of glycerol-1-$C^{14}$ (activity of 0.1 millicurie per gram). The ethanol is allowed to evaporate, and the film is then wet with water and irradiated at 50° C. in an atmosphere of moist nitrogen. Two mev. electrons are used, with a total dose of 40 mrad. The irradiated film is then extracted with water until the bound activity, determined by a Geiger counter, remains constant. The activity is 48 to 51 counts/min./2.5 cm.$^2$ above background.

When the test is repeated, the only difference being that the film is not pretreated with water prior to irradiation, a product is obtained which, after washing, retains an activity of only 1 count/min./2.5 cm.$^2$ above background.

A repetition of the test, using "66" nylon film as substrate shows a two-fold greater radiation count for the wetted test sample as compared to the control sample which was irradiated in the absence of water.

Similar results are obtained when stearic acid-2-$C^{14}$ is used as a modifying agent, grafted to either polyethylene terephthalate film or "66" nylon film.

*Example 46*

A 0.001 inch thick film of polyethylene terephthalate is immersed in a 10% aqueous solution of a polyethylene oxide ("Carbowax" 20,000) containing 0.1% of a commercial wetting agent ("Triton" X–100). The film, still wet with the solution, is wrapped in aluminum foil and irradiated at 50° C. with 2 mev. electrons to a total dose of 40 mrad. The irradiated film is then extracted with hot running water for 20 hours; it is observed to retain a visible film of the polyether which results in a weight gain of 20%. No further weight loss occurs on subsequently extracting the film with ethanol for 20 hours in a Soxhlet. The film shows a log R of 11.1.

In contrast, similar irradiation of a polyethylene terephthalate film carrying an air-dried coating of the polyether produces a film which, after similar extraction, exhibits no significant weight gain. The log R is over 13.

Similar improvement in grafting efficiency is obtained when polymethacrylic acid and polyacrylic acid are grafted to polyethylene terephthalate film in the presence of water. Not only is water useful in improving the efficiency of irradiation grafting, but also in many cases the use of a plasticizer or swelling agent will result in improved penetration and increased amount of the grafting agent bonded to the condensation polymer substrate.

Cross-linking of condensation polymer textiles is an attractive method for improving such properties as stiffness, resilience and crease recovery. These polymers are commonly used to form fibers by a melt-spinning technique; thus, they must be fluid below the decomposition temperature. However, for most satisfactory textile use, it would be desirable if plastic flow or fusing could be avoided at ironing or heat-setting temperatures. One means to accomplish this is to cross-link condensation polymer filaments after they have been shaped. By cross-linking, of course, is meant the creation of bonds between the linear polymer chains. A result of cross-linking is that the polymer or filaments therefrom may become infusible and insoluble in common solvents.

The process of this invention is highly useful for carrying out cross-linking treatments whereby the properties of textiles from condensation polymers are improved. Since it is difficult or impossible to reshape highly cross-linked polymers, cross-linking should be effected by an after-treatment; the process of this invention is especially suitable for such after-treatment.

It is, of course, known that large doses of high energy radiation cross-link polymeric substrates, provided degradation is not excessive. Ordinarily, however, such treatment is expensive due to the costly equipment and long time required, and in many cases this process is useless because the substrate is degraded by the amount of radiation required. The process of this invention permits cross-linking treatments with minimum doses of irradiation, thus avoiding these difficulties.

It is recognized that there is some cross-linking whenever a polymeric substrate is irradiated with high energy radiation. In addition, some cross links may be formed when grafting readily graftable monomeric constituents, since it is believed that some of the growing chains terminate and react (by coupling) with other molecules of the linear polymer substrate, thus forming an intermolecular bond.

A more useful and controllable type of cross-linking, which has been shown in Examples 20 and 21 is obtained by grafting di-unsaturates to polymer substrates. These compounds, when grafted, may form cross-links during irradiation, or they may be cross-linked by subsequent treatment, e.g., by heating.

Another type of cross-linking is carried out by grafting reactive groups to the polymer substrate, followed by a treatment with a compound (usually polyfunctional) reactive with such groups. This process is illustrated by Example 8, in which the polymer substrate is grafted with vinyl acetate, followed by hydrolysis to yield hydroxyl groups, which may in turn be cross-linked by reaction with a dibasic acid or formaldehyde. Another example of this type of process is illustrated by the following example.

*Example 47*

Following the procedure of Example 38, "66" nylon fabric is soaked in aqueous acrylic acid, followed by irradiation with 2 mev. electrons. After ungrafted polymeric acrylic acid is removed by extraction, the nylon with grafted acid (10%) is converted to the sodium salt by boiling in dilute sodium carbonate solution. The fabric is then padded to a 60% weight pickup (wet) with an emulsion of (parts by weight):

| | Parts |
|---|---|
| "Elvanol" 50–42 | 5 |
| "Paraplex" G–62 | 20 |
| "Eponite" 100 | 100 |
| Zinc fluoroborate | 7 |
| Water | 680 |

Excess liquid is then removed from the fabric by heating at 107° C. for 1 minute, at wet dimensions, followed by curing for 3.5 minutes at 163° C. at dry dimensions. The fabric is then neutralized in a 60° C. bath containing 0.5% $Na_2CO_3$ and 0.025% "Triton" X–100. The fabric is then rinsed and dried.

The "Eponite" epoxy resin cross-linked fabric is insoluble in formic acid, although the starting material (sodium salt of acid-modified polyamide) is soluble in formic acid. The treated fabric has superior wash-wear properties when subjected to an automatic washing machine washing and drying cycle. This improvement is obtained without appreciable change in fabric handle, unlike conventional application of this reagent to unmodified nylon.

It is thought that two factors contribute to the surprising results obtained here. Usual application of the epoxy resin to hydrophobic polymers results in a highly undesirable stiffening and harshness of the treated fabric. Treatment by the process disclosed herein is thought to be assisted by an open structure produced by the sodium-salt-reaction step; modification thus proceeds throughout the bulk of the fiber. In addition, there are many grafted reactive groups (e.g., —COOH) to which the additives may attach themselves.

The trade names of materials used in this example are identified as follows:

"Elvanol" 50-42—a high viscosity, 88% hydrolyzed polyvinyl alcohol sold by Du Pont, Wilmington, Del.

"Paraplex" G-52—a high molecular weight polyester plasticizer sold by Rohm & Haas, Philadelphia, Pa.

"Eponite" 100—an aliphatic polyepoxide of 300-400 molecular weight, containing more than one epoxide group per molecule, sold by Shell Chemical Co., New York, N.Y.

"Triton" X-100—(see Examples 16).

There are other post-treatments which may be used to cross-link the grafted condensation polymer substrate via reaction with functional groups of the grafted polymer. A useful treatment is disclosed in U.S. Patent 2,540,726, for example, which describes a process for treating "66" nylon fabric with anhydrous formaldehyde. It has been found that nylon of this example, having grafted acid groups, may be readily cross-linked by the formaldehyde treatment to give a fabric with higher dry crease recovery (90%), compared to modified acid grafted control (70%).

Another method of cross-linking according to the process of this invention is carried out by grafting two monomers which can be rendered mutually reactive after they have been grafted, as shown in the following example.

Example 48

A sample of nylon taffeta is sealed in an 8″ x 10″ polyethylene bag together with 100 cc. of a solution containing 35 cc. of methyl acrylate, 35 cc. of vinyl acetate, 22.5 cc. of methanol, and 7.5 cc. of water. The bag is irradiated with 2 mev. electrons, to a total dose of 4 mrad. Following the irradiation, the sample is extracted at 50° C. with acetone which readily removes the homopolymer. After vacuum drying, a weight gain of 79.7% is observed. The treated sample is divided into portions coded 48A, 48B, 48C and 48D.

Sample 48A is placed in a test tube containing 90% aqueous formic acid; it dissolves completely in 2 minutes. Sample 48B dissolves readily in a mixture of 85 parts phenol, 15 parts methanol. Sample 48C is agitated for 30 minutes with 100 cc. of 1% aqueous $ZnBF_4$ solution, is air dried and heated in a forced air oven at 165° C. for 5 minutes. Sample 48C also dissolves in formic acid as well as in the phenol-methanol solution suggesting that no cross-linking via ester exchange has occurred. Sample 48D is boiled in 150 cc. of 4% aqueous NaOH for 30 minutes (to hydrolyze the ester groups), rinsed in distilled water, boiled in 150 cc. of 1% acetic acid for 30 minutes, heated at 165° C. for 5 minutes and vacuum desiccated for 3 days. This sample is insoluble in the aqueous formic acid and the phenol-methanol solution. A high degree of cross-linking is apparent, due to esterification between the acid and alcohol groups obtained by hydrolysis of the grafted methyl acrylate and vinyl acetate.

This example illustrates the preparation of a cross-linkable synthetic linear condensation polymer by grafting compounds bearing complementary, post-reactable functional groups. Similar results are obtained by grafting an amine, e.g., allylamine, followed by grafting an acid, e.g., acrylic acid. The cograft product is then cross-linkable via an after-treatment. Similarly, cografts of aldehydes (e.g., acrolein) and amides (e.g., acrylamide) may be employed.

The process of this invention is also highly useful in modifying condensation polymer substrates which have been previously cross-linked; due to the cross-linking, said substrates are often highly resistant to dyeing and other treatments, which limits their utility in spite of their high resilience and crease recovery. This process is illustrated by the following example.

Example 49

A swatch of nylon fabric is treated according to the process of Graham and Schupp, as described in U.S. Patent 2,540,726. In following this procedure, the fabric is scoured, then soaked overnight at room temperature in a 1% solution of aqueous ammonium chloride. The excess solution is squeezed from the fabric which is then air dried at room temperature. The treated sample is ironed, rolled into a cylinder and placed in a test tube which in turn is placed in a vapor bath maintained at 150° C. The fabric is heated for 5 minutes to remove last traces of moisture, then formaldehyde vapors are introduced. The formaldehyde treatment lasts for 15 minutes. This sample has a log R of 13.3 (high static propensity), a low wickability, and is difficulty dyeable with disperse dyes. The formaldehyde-treated sample is then soaked in a solution of 30% aqueous sodium styrene sulfonate, at a temperature of 80° C., and is then irradiated using 2 mev. electrons to a dose of 1 mrad. Only a negligible weight gain is observed, which is thought to be due to the fact that the cross-linked structure is not readily penetrated by the treating agent. The log R of the irradiation grafted fabric is 9.8, it has a dry crease recovery of 86%, and is now highly wickable. The untreated formaldehyde-cross-linked nylon has a dry crease recovery of 85%.

Other agents which may be advantageously grafted to the formaldehyde-cross-linked nylon are acrylic acid, styrene sulfonic acid, N-vinylpyrrolidone, acrylamide and the like.

The following examples illustrate the use of acetylenic compounds in the process of the instant invention.

Example 50

1.8 parts of "66" nylon fabric and 2.0 parts of polyethylene terephthalate fiber fabric are wet out together with 5 parts of a 10% by volume solution of propiolic acid in water, wrapped in aluminum foil and let stand at least one-half hour. The package is exposed to 500 watt-sec./$cm.^2$ of 2-mev. electron radiation.

The fabrics are removed from the foil, rinsed in water and laundered in a mechanically agitated washer for 30 minutes in a 0.125% "Tide" detergent at about 70° C. They are rinsed, conditioned at 50% R.H. and 23° C. and weighed. The nylon fabric is found to have gained 20% in weight and the polyester fiber fabric 0.8%. After boiling in 1% calcium acetate solution, the nylon fabric has a sticking point on a hot brass block of 350° C. as compared with 240° C. for a control nylon fabric.

Example 51

"66" nylon fabric (1.9 parts) is wet out in a solution of 2 parts of propargylsuccinic acid in 5.6 parts of water and let dry. The fabric is wrapped in aluminum foil and irradiated as described in Example 50. It is rinsed, washed and conditioned also as in Example 50. It is found to have gained 18.9% in weight and has a log R of 11.8. In the form of its calcium salt it has a sticking point above 390° C.

Example 52

Example 50 is repeated except that the fabrics are wetted with phenylacetylene in place of aqueous propiolic acid prior to irradiation. The treated nylon and polyester fiber fabrics after laundering and conditioning are found to have gained 9.0 and 4.7% in weight, respectively. The polyester fabric acquires a bright yellow color and the nylon a somewhat lighter color.

Example 53

A variety of acetylenic compounds are attached to "66" nylon and polyethylene terephthalate fiber fabric Samples 53A to 53L, as described in Example 50. The results are given in the following table:

| Sample | Fabric | Modifier Name | Modifier Solvent | Radiation exposure watt, sec. per cm.$^2$ | Weight gain | Remarks |
|---|---|---|---|---|---|---|
| 53A | 66 Nylon | 2-methyl-3-butyn-2-ol | None | 500 | 9.5 | Light yellow. |
| 53B | do | 25% phenylpropiolic acid | 67% acetone | 500 | 7.5 | Do. |
| 53C | Polyethylene terephthalate | do | do | 500 | 0.8 | |
| 53D | 66 Nylon | 20% acetylene-dicarboxylic acid mono K salt. | H$_2$O slurry | 500 | 12.6 | |
| 53E | Polyethylene terephthalate | Propargyl alc | None | 500 | 1.1 | |
| 53F | 66 Nylon | 33% propargyl alc | H$_2$O | 500 | 3.4 | Yellow. |
| 53G | do | Hexyne-1 | None | 500 | 2.7 | |
| 53H | Polyethylene terephthalate | do | do | 500 | 0.5 | |
| 53I | 66 Nylon | 33% 2-butyne-1,4-diol | H$_2$O | 500 | 1.6 | Light yellow. |
| 53J | do | 25% 2,5-me$_2$-3-hexyne-2,5 diol. | H$_2$O | 500 | 1.7 | |
| 53K | do | 1-ethynyl-cyclohexanol | None | 500 | 1.1 | |
| 53L | do | 1-diethyl-amino-2-propyne | do | 500 | 0.7 | Do. |

*Example 54*

A sample of fabric woven from continuous filament polyethylene terephthalate yarn is soaked in 25% aqueous acrylic acid for 18 days, and is then irradiated, using 2 mev. electrons, to a dose of 20 mrad. After rinsing in distilled water at 80° C. for 1 hour, to remove ungrafted homopolymer, the weight gain is 4%. When the grafted acid is converted to the sodium salt form by boiling in dilute sodium carbonate solution, the log R is 9.0 as compared to a value of 13.3 for the unmodified control. Hole melting resistance is improved from an original rating of "poor" to a rating of "good."

*Example 55*

A solution of 10% acrylic acid in water is prepared and thermostated to 90° C. Ten swatches of a 100% polyethylene terephthalate fabric (5" x 7", approximately 4 g. each) are introduced and soaked for 30 minutes. At the end of this time the samples are placed in trays under a thin layer (approx. 0.5 cm.) of the mother liquor and irradiated for 1 mrad with 2 mev. electrons. During the time required for irradiation the trays are thermostated to 90° C. The samples are washed four times in distilled water at approximately 70° C., dried, and weighed. Average weight gains are 1.69%. These samples show a loss in reflectance of 8 units after a laboratory laundering test (described in Example 7) as compared to 50 for a non-treated control.

*Example 56*

A solution consisting of 3% polyacrylic acid in water is prepared. Ten 5" x 7" swatches of a 100% polyethylene terephthalate fabric are wet out with this solution at room temperature. The samples are then placed in trays under approximately 0.5 cm. of the polyacrylic acid solution and irradiated with 2 mev. electrons to a dose of 50 mrad. The samples are washed several times in hot distilled water to remove ungrafted material. After drying, these samples show an average weight gain of 1.54%. After a laboratory laundry test their reflectance diminishes by 4.3 units as compared to 50 for an untreated control.

Thus, by the process shown in the above examples, greatly improved resistance to soil is imparted to a terephthalate polyester textile, by grafting organic acid groups thereto. For this purpose, any organic acid is suitable, but the unsaturated organic acids are, of course, preferred. Polymeric acids are also useful, as shown in Example 56.

POLYMER SUBSTRATE

The synthetic organic condensation polymers used in the process of this invention are those which are primarily carbonaceous in character, i.e., have polymer chains which consist primarily of carbon-carbon bonds. Alternatively, polymeric materials with carbon-oxygen bonds (e.g., polyoxymethylene) are also operable. The preferred polymers are those which have a linear structure, i.e., are prepared from primarily difunctional ingredients. Such polymers are eminently suited to the production of fibers and films, to which the process of this invention is most advantageously applied. Since the preferred polymers are those which are fiber- or film-forming, they are characterized by having a high molecular weight; typically, polyamides should have a number-average molecular weight of 10,000 or more.

As illustrated in the examples, the shaped article produced from the synthetic organic condensation polymer acts as a substrate to which the organic compound is grafted by means of the ionizing radiation. Such shaped articles may be made by processes known to the prior art. As previously mentioned, these compounds include polyureylenes, polyamides, polyethers, polyoxymethylenes, polyacetals, polyureas, polyurethanes, polyesters, polysulfonamides and the like. Typical processes for producing synthetic condensation polymers are disclosed in United States Patents Nos. 2,071,250, 2,071,253, 2,130,523, 2,130,948, 2,190,770, 2,284,637 2,321,890, 2,321,891, 2,465,319, 2,604,689, 2,647,104, 2,731,446 and British Patent 535,139.

SUBSTRATE SHAPE

Shaped articles may be made by extrusion, molding, casting and the like. The shape of the article to which the organic compound is adhered is not critical; it is sufficient that it be a solid so that the location of the modifier may be readily controlled. Thus the process of the present invention may be applied to a solid substrate in any form such as a fiber, film, sponge, or pellicle. It may be in the form of a woven, knitted, or felted fabric, a paper, a bristle, a fibrid, or artificial straw. Alternatively, the structure may be a flake, powder, or comminuted particle, which may be reshaped after grafting to form an article of specific end use. The shape is not a critical element in the treatment, except that shapes of increased thickness require a proportionately greater soaking time or high temperature or pressure when complete diffusion of the organic modifier is desired. If limited penetration is desired, thickness of the shaped structure is not of importance in determining process details. It is merely sufficient that the irradiation employed have enough penetration to activate the substrate at least to the maximum depth required to effect the desired grafting to the shaped polymer.

OPERABLE MODIFIERS

Any organic compound may be employed as the modifying material which may be grafted to the shaped article. By an "organic compound" is meant a material having the formula $CX_4$ where X is a member of the group consisting of hydrogen, halogen, nitrogen, nitrogen radical, oxygen, oxygen radical, sulfur, sulfur radical, or organic radical linked to the CX residue by a carbon to carbon bond. By "organic radical" is meant a radical predominantly hydrocarbon except for the presence of substituents listed immediately above. Furthermore, the C may be doubly bonded to no more than one S= or O= atom; i.e., only one pair of X's may be replaced by a divalent oxygen or sulfur atom. Compounds with ethylenic unsaturation are especially preferred, since a minimum radiation dose is required to graft a given weight of modifier.

UNSATURATED MODIFIERS

Among suitable materials are hydrocarbons such as ethylene, propylene, styrene, α-methyl styrene, divinyl benzene, 1-,3-butadiene, 2-,3-dimethyl-1,3-butadiene, 2-chloro-2-,3-butadiene, isoprene, cyclopentadiene, chloroprene; acids such as maleic acid, crotonic acid, dichloromaleic acid, furoic acid, acrylic acid, methacrylic acid, undecylenic acid, cinnamic acid; amides such as acrylamide, methacrylamide, N - methylolacrylamide, N-methyl-N-vinyl formamide, N-vinyl pyrrolidone, methyl substituted N-vinyl pyrrolidone, vinyl oxyethyl formamide, methylene - bis - acrylamide, N-allylcaprolactam; acrylate esters such as methyl acrylate, ethyl acrylate, benzyl acrylate, octyl acrylate, methyl methacrylate, butyl methacrylate, vinylacrylate, allyl acrylate, ethylene diacrylate, diallyl itaconate, diethyl maleate, N,N-diethylaminoethyl methacrylate, dihydroxy dipyrone; nitriles such as acrylonitrile, methacrylonitrile; acrylyl halides such as acrylyl chloride; vinylic alcohols such as allyl alcohol, furfuryl alcohol, 3-hydroxycyclopentene, dicyclopentenyl alcohol, tropolone; aldehydic compounds such as acrolein, methacrolein, crotonaldehyde, furfural, acrolein diethyl acetal; vinyl amines such as vinyl pyridine, allyl amine, diallyl amine, vinyloxyethylamine, 3,-3-dimethylamino - 1 - butene, N,N-diacryltetramethylene diamine, N,N-diallyl melamine, diamino octadiene; quaternized amines such a tetraallyl ammonium bromide, vinyl trimethyl ammonium iodide, the quaternary methiodide of methylene-3-aminomethylcyclobutane; vinylesters such as vinyl acetate, vinyl salicylate, vinyl stearate, allyl formate, allyl acetate, diallyl adipate, diallyl isophthalate; vinyl ethers such as allyl glycidyl ether, vinyl 2-chloroethyl ether, dihydropyrane, methoxy polyethyleneoxymethacrylate; vinyl halides such as vinyl chloride, vinyl fluoride, tetrachloroethylene, tetrafluoroethylene, 1-,1-dichloro-2,2-difluoroethylene, vinylidene chloride, hexachloropropene, hexachlorocyclopentadiene, p-chlorostyrene, 2-,5-dichlorostyrene, allyl bromide, 2-bromoethyl acrylate, vinyl tetrafluoropropionate, 1-,1-,7-trihydroperfluoroheptylacrylate; isocyanate type compounds such as vinyl isocyanate, acrylyl isocyanate, allyl isothiocyanate; vinyl ketones such as methyl vinyl ketone, ethyl vinyl ketone; cyanides such as methacrylyl cyanide, allyl isocyanide; nitro compounds such as 2-nitropropene, 2-nitro-1-butene; phosphorous containing vinyls such as diethyl vinyl phosphate, diphenyl vinyl phosphine oxide, 1-phenyl-3-phosphacyclopentene-1-oxide, diallyl benzene phosphonate, potassium vinyl phosphonate, bis-chloroethyl vinyl phosphonate; also included are alkyl, aryl, aralkyl phosphonates, phosphites and phosphonates, sulfur containing vinyls including sulfonate, sulfonamides, sulfonamides, sulfones, sulfonyl halide, thiocarboxylates, diallyl sulfide, ethylene sulfonic acid, allyl sulfonic acid, methallyl sulfonic acid, styrene sulfonic acid, 2-methyl-propene-1,3-disulfonic acid, also including salts and esters of the sulfonic acids; epoxy vinyls, such as butadiene oxide, 1,2-diisobutylene oxide, glycidyl methacrylate.

Acetylenes such as phenylacetylene, acetylene dicarboxylic acid, propiolic acid, propargylsuccinic acid, propargyl alcohol, 2-methyl-3-butyn-2-ol, 2,2,3,3-tetrafluoro-cyclobutylvinylethyne and the like may be used successfully.

NON-POLYMERIZABLE MODIFIERS

In addition to compounds containing ethylenic unsaturation, it has been found that compounds can be grafted, according to the process of this invention, which are ordinarily regarded as non-polymerizable. By non-polymerizable is meant those compounds, free from aliphatic unsaturation, which do not polymerize by free radical initiation. Due to the efficiency of the high-energy radiation in producing free radicals, it is theorized that free radicals are produced simultaneously on the polymer substrates and on the saturated non-polymerizable compounds, whereupon grafting ensues. The preferred non-polymerizable compounds are those which have functional groups which are useful in modifying polymer properties. Thus, such compounds are included as hydrocarbons, alcohols, acids, ethers, ketones, esters, aldehydes, isocyanates, sulfonates, mercaptans, thioethers, disulfides, nitriles, nitro compounds, amines, amides and halides. Typical of suitable alcohols are the alkanols such as methanol, ethanol, laurol, the polyols, such as glycerine, pentaerthritol, sorbital, mannitol, their partial esters and the like. Dialkyl ethers such as dimethyl, diethyl, ethylmethyl and the glycol ethers as well as the oxyalkylated ethers of partial esters of the polyols, such as the polyoxyethylene derivative of a fatty acid partial ester of sorbitol are suitable. Mercaptans and thioethers analogous to the above may be used as may also disulfides of a similar nature. As amines may be mentioned the alkyl amines such as methyl amine, ethyl amine, hexamethylene diamine and dodecylamine. The amides of these amines formed with acids such as formic acid, adipic acid, suberic acid, stearic acid and the like are useful; alternatively, the acids alone are often desirable modifiers. Halides within the preferred class include the alkyl halides such as chloromethane, chloroform, carbon tetrachloride, chloroethane, chloroethylene, dichlorodifluoromethane, dodecafluoroheptyl alcohol and similar materials.

Of the non-polymerizable compounds, those organic compounds, the bonds of which are easily broken, as for instance, chain transfer agents, are particularly preferred, since larger amounts of modifier are grafted with a given irradiation dose.

It is, of course, obvious that low molecular weight non-polymerizable modifiers are preferred, when it is desirable to have the modifier penetrate into the polymer substrate, to make a bulk modification. It has been observed that modifiers with functional groups which have a swelling effect upon the polymer substrate are usually especially effective in penetrating the substrate.

POLYMERIC MODIFIERS

Polymeric modifiers are a preferred class for grafting to polymeric substrates, especially those substrates which are in the form of fibers, filaments, fabrics or the like. These modifiers are especially suitable when a surface coating is desired, since it is obvious that they will penetrate to a lesser extent.

These polymeric materials may be either polymerizable, due to the presence of reactive functional groups or residual unsaturation, or non-polymerizable. When irradiating these compositions, it is believed that the coating is grafted by chemical bonds to the fiber surface. Therefore, the process of this invention gives a much more durable coating then those obtainable by prior art processes which require polymerization initiators to cross-link the coating, and depend on mere physical bonds to retain the coating upon the polymer substrate. The polymeric modifiers are especially adaptable to the process of this invention, since relatively few bonds are needed to graft each large macromolecule to the substrate surface.

The process of this invention is especially suitable for washfast modification of fibers and fabrics, as has been shown by the examples hereinabove. An important feature is that these advantages are obtained primarily because these polymeric modifiers are applied in a relatively fluid state, (e.g., from solutions) so that each filament in the fabric is individually coated, and large excesses of the modifier are avoided. Excess amounts of modifier result in a deleterious effect on fabric hand, and often render the fabric unfit for apparel use. The preferred polymeric modifiers are those which are soluble or dispersible in aqueous solutions, although other solvents may be used in some cases. However, water is the preferred solvent because of its cheapness, availability, and freedom from hazards. Thus, such polymers are preferred as the polyether glycols, polypropylene ethers, polymeric alcohols, polymeric acids, polymeric amines, polymeric amides, and the like. These compounds are useful, for example, in increasing moisture regain, anti-static effect, and wickability of condensation polymer substrates which otherwise are highly hydrophobic. Alternatively, water repellence can be improved by grafting hydrophobic polymeric materials, usually utilizing a solvent other than water. Examples of such hydrophobic polymers are polytetrafluoroethylene, polyvinyl chloride, polymeric esters, and the like.

STRUCTURE OF GRAFT COPOLYMER PRODUCT

The process of this invention produces a polymeric structure which has been termed a graft copolymer, that is, a polymer in which modifying agent (monomer, organic compound, or other polymeric chain), is grafted by chemical bonds, usually as a side chain, to the parent polymeric substrate.

Conventional copolymers, consisting of monomer species A and B, have a random distribution along the backbone of the polymer molecule, and may be represented schematically thus:

—AAABBABBBABAA—

The graft copolymer species with which this invention is concerned, consists of a main chain of polymer A, and side chains of polymer B grafted thereto, represented below:

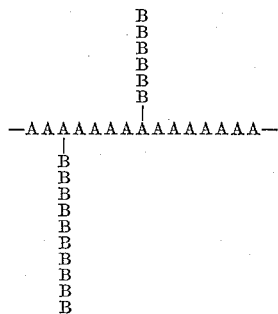

The characteristic of this copolymer type is that its gross properties remain predominantly those of the polymer (A) forming the molecular backbone. However, modifications can be produced via polymer (B) grafts, in most cases, without loss of the original desirable properties. As an example, conventional copolymers usually have a lower melting point than those of either component, while graft copolymers usually retain the high melting point of the pure backbone component. The structure and preparation of some examples of these copolymer types is discussed in a comprehensive review article by E. H. Immergut and H. Mark in Macromolekulare Chime, 18/19, 322–341 (1956).

APPLICATION OF MODIFIER

The organic compound may be applied to its shaped substrate by immersion, padding, calendering, spraying, exposure to vapor condensation, or by other similar means. It is sometimes desirable to remove excess liquid by squeezing prior to exposure to irradiation. Alternatively, the organic compound may be deposited upon the shaped substrate by flashing off the solvent in which it is dissolved prior to application.

As described previously, it is desirable that the modifier be applied to the substrate in a highly fluid condition; thus, application from solutions with a viscosity of the same order of magnitude as water are preferred. This permits completely coating each fiber of filamentous substrates.

It will be noted that the process of this invention is restricted to applying the modifier to the surface of the shaped condensation polymer substrate, followed by irradiation to induce grafting. It is thus distinct from the process disclosed and claimed in copending application Ser. No. 569,976 which describes the process of dispersing a modifier uniformly throughout a condensation polymer substrate prior to inducing grafting by high energy ionizing irradiation. The process of the instant invention is directed to producing modifications throughout the bulk of the polymer substrate only when the modifier, applied to the surface, penetrates therethrough; for modifiers which do not penetrate, modification is restricted to the surface.

Thus, when the polymer is penetrated with the modifier prior to initiating the graft polymerization, modification of the shaped structure extends at least through a substantial proportion of the body of the final product.

Increased contact time and agitation are helpful in increasing penetration. It is sometimes beneficial to carry out the soaking for penetration at elevated temperatures at super-atmospheric pressure or in the presence of swelling agents, dye carriers, or the like. However, elevated temperatures are to be avoided when using modifiers, such as strong acids, which may degrade hydrolysis-susceptible polymers. Minor amounts of wetting agents, surface active compounds, and the like are useful for improving penetration efficiency.

When it is desirable to limit penetration of the polymerizable composition to a zone near the substrate surface, this may be accomplished by reduced contact time or temperature or use of modifiers with greater chain length. Alternatively, the shaped substrate may be exposed to the modifier for the time required to effect the desired penetration, then penetration may be stopped by freezing, for example, with Dry Ice. The combination may then be irradiated while frozen, and grafting will occur when the combination is warmed.

Where the modifier is applied from a solution, water is usually the preferred solvent. Other liquids are suitable for this purpose, however, such as alcohol, benzene, toluene, glycol, high boiling ethers and the like; where high soaking or irradiation temperatures are used, a nonvolatile solvent is often advantageous.

RADIATION WHICH IS EFFECTIVE

The ionizing radiation useful in the process of this invention must have at least sufficient energy to nonselectively break chemical bonds. This radiation is to be distinguished from ultraviolet radiation, which is effective in activating or ionizing only specific chemical bonds; such bonds are responsive to ultraviolet radiation only of a given wavelength or wavelengths. It is often necessary to use an ultraviolet photo-initiator in such reactions, so that light of available wavelengths will initiate the desired chemical reaction. In contrast, the ionizing radiation of this invention has sufficient energy so that it exceeds that which is required to break any chemical bond. Thus, this ionizing radiation serves to activate polymer substrates so that chemical reactions are initiated with any organic compound, or, alternatively, to activate non-polymerizable organic compounds so they react with the polymer substrate.

In general, ionizing radiation is preferred which has sufficient energy so that appreciable substrate thickness is penetrated, and in addition radiation absorption by the atmosphere is sufficiently low so that it is unnecessary to operate in a vacuum. Such radiation has energy of at least 0.1 mev. Higher energies are even more effective; the only known upper limit is imposed by available equipment.

The ionizing radiation of the process of this invention is generally considered in two classes: particle radiation, electromagnetic radiation. Effects produced by these two types of radiation are similar, since in their interaction with matter, each generates secondary radiation of the other type. The important consideration is that the incident radiation exceed a minimum threshold energy. Details of the mechanism of the interaction of high energy electrons with organic matter, including polymers, are not completely known, but the initial reaction may be considered to be the absorption of energy by the valence electrons of the irradiated molecules in or near the path of the high energy electrons. The absorbed energy may be so great that some valence electrons will be shot off fast enough to ionize still other molecules. Some of the displaced electrons fall back to form neutral molecules and give up their energy as electromagnetic irradiation, which in turn can be absorbed by other molecules and raise them to an excited stage. Further redistribution of the energy in the molecules results primarily in splitting off of H atoms producing free radicals or unsaturation.

The similarity of effect between the two types of radiation is thought to be due to the fact that an electron is ejected when an atom absorbs a quantum of high energy X- or gamma-rays; the electron has sufficient energy so that it in turn ejects electrons from other atoms, corresponding in effect to irradiation with an electron beam. Thus, the initial effect of high energy irradiation is to produce high energy electrons, which within the irradiated substrate produce free radicals. Consequently, the effects produced by particle and electromagnetic irradiation of equivalent energy are very similar, and differ only in the rate at which the effect is produced, which is a function of dose rate. The dose rate is a function of the equipment available to produce it, rather than an inherent limitation of the type of irradiation. Thus, with present day equipment, higher dose rates are obtainable with electron irradiation than are obtainable with X-rays of equivalent energy.

Although the fundamental particles differ from one another in size and charge their mechanism of energy loss is essentially the same. Thus, their effect on chemical reactions is also similar. Although the neutron is not a charged particle, it however produces protons and gamma-rays which lose energy in the normal ways and consequently is effective in the process of this invention.

The heavier charged particles, like the electrons, undergo inelastic collisions with the bound electrons of atoms which they eject to produce ions. Some of these ejected electrons may be sufficiently energetic to produce ionizations of their own. The energy of all these particles is used up in removing the bonded electron (i.e., in ionization) and in producing excited atoms until all the electrons have become of such low energies that they can no longer produce ionizations and are captured to form negative ions. Neutrons do not produce ionization directly but knock out protons from the nucleus of the atoms they traverse. The chemical effects of fast neutrons are, therefore, almost wholly due to protons in exactly the same way as the effects of X-rays are produced by the ejected electrons. Unlike the other ionizing radiations, however, the number of ionizations produced by neutrons depends largely on the nature of the elementary composition of the material through which the neutrons pass. The reason for this is that the trasfer of energy between neutrons and protons does not depend on the atomic number but on other factors, such as chemical composition of the absorbing material.

Therefore, the high energy particle radiation effective in the process of this invention is an emission of highly accelerated electrons or nuclear particles such as protons, neutrons, alpha particles, deuterons, beta particles, or the like, directed so that the said particle impinges upon the polymer bearing the organic compound. The charged particles may be accelerated to high speeds by means of a suitable voltage gradient, preferably at least 0.1 mev., using such devices as a resonant cavity accelerator, a Van de Graaff generator, a betatron, a synchrotron, cyclotron, or the like, as is well known to those skilled in the art. Neutron radiation may be produced by bombardment of selected light metal (e.g. beryllium) targets with high energy positive particles. In addition, particle radiation suitable for carrying out the process of the invention may be obtained from an atomic pile, or from radioactive isotopes or from other natural or artificial radioactive materials.

Similarly, ionizing electromagnetic radiation useful in the process of this invention is produced when a metal target (e.g., gold or tungsten) is bombarded by electrons possessing appropriate energy. Such energy is imparted to electrons by accelerating potentials in excess of 0.1 million electron volts (mev.). Such radiation, conventionally termed X-ray, will have a short wavelength limit of about 0.01 Angstrom units (in the case of 1 mev.) and a spectral distribution of energy at longer wavelengths determined by the target material and the applied voltage. X-rays of wavelengths longer than 1 or 2 Angstrom units are attenuated in air thereby placing a practical long wave length limit on the radiation. In addition to X-rays produced as indicated above, ionizing electromagnetic radiation suitable for carrying out the process of the invention may be obtained from a nuclear reactor ("pile") or from natural or artificial radioactive material, for example, cobalt 60. In all of these latter cases the radiation is conventionally termed gamma-rays. While gamma radiation is distinguished from X radiation only with reference to its origin, it may be noted that the spectral distribution of X-rays is different from that of gamma-rays, the latter frequently being essentially monochromatic, which is never the case with X-rays produced by electron bombardment of a target.

RADIATION ENERGY

To be efficient in the practice of the present invention, it is necessary that the high energy particles have sufficient velocities to permit penetration of several layers of material, when fabrics or films are being treated. Although an energy of about 50 mev. is enough to initiate the grafting reaction, energies of at least 0.1 mev. are preferred, for efficient penetration. The velocity required will depend on the nature of the particle and also on the nature of the substrate to a certain extent. An electron which is accelerated by a potential of a million volts (mev.) will effectively penetrate a thickness of polyhexamethylene adipamide fabric of about 0.25 cm. A more universal measure of penetration for all substrates is in units of grams penetrated per square centimeter irradiated. Thus, 2 mev. electrons will effectively penetrate 0.7 gm./cm.$^2$ of any shaped article, while 1 mev. electrons are effective for 0.35 gm./cm.$^2$.

As stated previously, there is no known upper limit to the particle energy, except that imposed by present day equipment. Thus, energies equivalent to 24 mev. to 100 mev. may be used.

As a guide in using other charged particles which have been shown to be effective in grafting, Table 36 shows particle energies required to give penetration equivalent to 0.1 mev. electrons.

TABLE 36

| Particle: | Accelerating potential, mev. |
|---|---|
| Electron, e | 0.1 |
| Proton, H$^+$ | 3.0 |
| Deuteron, D$^+$ | 4.0 |
| Alpha, He$^{++}$ | 12.0 |

It should be recognized that the heavier charged particles are especially adapted to creating surface effects, due to their lower penetration at a given energy. In situations where surface effects are paramount, it is not necessary that the shaped article be completely penetrated by the high energy particle and lower accelerations may be employed. Under these conditions, if the surface effect is to be applied to both sides of the shaped article, it will obviously be necessary to expose each of the surfaces to the particle radiation. This is done by simultaneously bombarding both sides of the shaped article or alternatively by subjecting each side to the single source of irradiation during different runs.

High energy particle radiation has special utility for grafting modifiers to thin substrates, e.g., fabrics, filaments and films. The required irradiation doses with present day electron accelerators, such as exemplified herein, are attained rapidly, in a matter of seconds, thus promoting a high rate of throughput.

In comparison, high energy electromagnetic radiation in short wave lengths is highly penetrating, and hence readily lends itself to treating massive substrates. When grafting to the preferred substrates of this invention, this type of radiation is especially useful for irradiating materials present in multiple layers. For example, rolls of film, bolts of fabric, yarn packages, bales of staple fiber, or the like, may be irradiated as a single unit.

As an illustration, X-rays generated by electrons of 2 Mev. have adequate penetration for polymer samples of several inches in thickness. Lower energy (longer wave length) X-rays are of course less penetrating, so that it may be necessary to reduce the thickness of material to be treated simultaneously. In addition, the very long (soft) X-rays because of low penetration may be especially effective in producing surface effects.

Although the treatment can be carried out using conventional X-ray equipment, the use of radioactive isotopes such as cobalt 60 is especially economical. Radiation from waste fission products, with particle irradiation screened off if desired, is also effective and offers an opportunity to utilize an otherwise useless waste product.

RADIATION DOSE

In determining the optimum dose of irradiation for any particular combination, both the nature of the organic compound and the nature of the solid substrate must be considered. For example, for vinyl monomers which are readily graftable, and polymer substrates that are readily activated by ionizing radiation, it appears that the greater part of the minimum irradiation dose is required to consume the inhibitor (including oxygen) which may be present in the vinyl monomer. After that is done, relatively low additional doses will produce enough radicals to initiate graft polymerization. For combinations of this type, e.g., nylon and acrylic acid, a high propagation constant is observed. Thus, the extent of irradiation-induced polymerization can be increased by increasing either radiation dose, post-irradiation time, post-irradiation temperature, or all three. For instance, when nylon soaked in acrylic acid solution is irradiated with a dose of 0.06 mrad, acid equivalent to only 300 carboxyls/$10^6$ gm. are grafted, if monomer is removed from the sample immediately after irradiation (e.g., by a water extraction). On the other hand, with same dose, if the irradiated sample is kept in contact with the acrylic acid solution for 1 hour at room temperature, 1000 carboxyls are grafted. Thus, for polymerizable vinyl compounds and readily graftable polymer substrates such as "66" nylon, a minimum dose of 5000 rads (0.005 mrad) is required to initiate significant amount of grafting.

When unsaturated compounds which are not homopolymerizable (e.g., maleic acid) are used as the modifier, in combination with readily graftable substrates such as "66" nylon, doses of 0.1 mrad are required to initiate appreciable grafting.

When non-polymerizable organic compounds or polymeric modifiers are used, a minimum dose of 1 mrad should be employed.

Radiation doses below the minimum specified fail to initiate beneficial amounts of grafting within a practical length of time. This is due to the fact that the life of free radicals produced by the irradiation depends on a balance between competing (i.e., non-grafting) reactions and those which produce grafting.

It is obvious, of course, that even lower doses may be used in completely inhibitor- and oxygen-free systems, or if irradiation-initiation of grafting is supplemented by a chemical initiator.

Although the minimum doses specified are effective, higher dosages may be used and are usually highly beneficial. Dosages so high that substantial degradation of the shaped substrate occurs must obviously be avoided. High doses cross-link some polymers, which may sometimes be undesirable. In general, fibers produced from polyhexamethylene adipamide and polyethylene terephthalate may be irradiated to a dosage as high as 100 mrad. However, it is preferred that the dosage applied to these substrates not exceed about 50 mrad. Polyoxymethylene substrates generally should not be exposed to a dose greater than 25 mrad.

The distinction between "available irradiation" and "dose" should be recognized. The 2 mev. Van de Graaff electron accelerator used in many of the examples, operated as described, provides 12.5 watt seconds of irradiation per $cm.^2$ of substrate, per pass. For thin, organic polymer substrates (i.e., having a thickness of a few millimeters), the dose (energy absorbed) is about 1 mrad. Since much of the energy of the incident beam is not absorbed, several (fabric) samples may be irradiated simultaneously, each absorbing a dose of 1 mrad. Thicker substrates may absorb substantially all of the incident radiation energy, but the dose absorbed in the layers more distant from the electron source may not be sufficient to form a useful number of free radical sites. This effect is illustrated in Example 2.

REACTION CONDITIONS

Once free radicals are produced on the carbon atoms of the polymer chain in the presence of a vinyl monomer, vinyl polymerization is initiated, and polyvinyl chains grow from the initiating site.

However, it has been observed that the life of free radicals are many times greater than has been found in vinyl polymerizations carried out in solution or emulsions. For this reason, at a given radiation dose, the yield of polymer grafted to the shaped substrate is much greater than would be obtained, for example, if the substrate polymer were dissolved in the vinyl monomer and the solution irradiated.

The average molecular weight of the grafted polymer chains (at a given constant weight gain) may be controlled by adjusting the radiation dose. It may also be adjusted by controlling chain transfer to the substrate polymer, e.g., by changing grafting temperatures, or modifying the substrate polymer by incorporating copolymer components which are more (or less) susceptible to chain transfer. Similarly, the molecular weight distribution of the grafted polymer chains may be adjusted. By controlling the number, length and length distribution of grafted chains, the effect produced by a given grafting agent may be modified.

It has been observed that irradiation of the modifier-treated shaped substrate in the presence of air or moisture may occasionally cause some degradation; such adverse effects can be avoided by employing an atmosphere of inert gas around the article while it is being irradiated. Alternatively, a satisfactory and simpler approach is to wrap the sample in a material which is substantially air and water impervious, thus limiting the quantity of air or moisture contacting the sample. Complete exclusion of oxygen is not required, although it may contribute to grafting efficiency when using a viynl monomer. In some of the examples the samples are wrapped in polyethylene film. Aluminum foil is satisfactory. The nature of such wrapping material is not critical, provided it is substantially impervious to air and moisture, when required, and is readily penetrated by the radiation.

IRRADIATION CONDITIONS

It is within the scope of this invention to include in the combination to be irradiated, materials which may have a protective or antioxidant effect in preventing radiation degradation of either modifier or substrate or both. Compounds of this type are cysteine, carbon, polyethylene glycols and the like. It is also within the scope of this invention to include in the combination to be irradiated materials which absorb radiation and transmit the energy thus absorbed to the modifier or the organic polymeric material or both, whereby adhering is promoted and the efficiency of utilization of the radiation is increased. Compounds with this property are somewhat similar to sensitizers in photography, except that in this case useful materials absorb high energy radiation and emit the energy in a lower or more usable range. Phosphor screens containing calcium tungstate, zinc sulfide or metallic lead or the like have utility for this purpose. The phosphor materials may be used as plates contacting the material being treated, or may be incorporated in the modifying agent or even be coated on or dispersed in the organic polymeric material which it is desired to modify.

The irradiation may be accomplished over a wide range of temperatures. However, a low temperature decreases the tendency toward oxidation. Since the absorption of particle radiation frequently causes a temperature increase in the range of about 2° C. for each mrad absorbed, if high tube current is employed so that absorption is complete within a short time interval, it is usually advisable to provide means to remove the heat generated to avoid injury to the sample. The use of dry ice to maintain a cold atmosphere is very satisfactory for this purpose. In general, irradiation at a higher temperature promotes the speed with which bonding occurs, thus promoting a higher throughput of a given piece of equipment at a constant radiation dosage. Temperatures ranging from -80° C. or less, up to and even above the melting point of the polymer substrate may be employed. More efficient grafting is often noted when irradiation temperatures are in the range of 100 to 160° C., as shown in Example 44. This is especially desirable for polyethylene terepthalate substrate, which is preferably both soaked in the modifier and irradiated at temperatures of 90° C. or above.

In general, for the greatest weight of modifier grafted for a given dose, the organic compounds are applied to the substrate as liquids or solutions, the solutions being of relatively high concentration. Such procedure provides the maximum opportunity for the organic compound to be bombarded by the high energy particle. At times, the concentration of the organic compound on the substrate will noticeably affect the final properties. For example when "66" nylon fabric is modified with polyethylene glycol 20,000 from a 16% aqueous solution, the fabric resulting after irradiation has good antistatic properties and a waxy hand. A satisfactory product from the antistatic standpoint can be produced by treating the fabric with an 8% solution of polyethylene glycol 20,000, without imparting the waxy hand.

Prior to treatment, the shaped article, such as a filament, may be oriented by hot or cold drawing. It may contain fillers such as pigments, antioxidants, fillers, polymerization catalysts and the like. After the irradiation the product may be after-treated. Frequently a certain amount of decomposition occurs at the surface which is readily removed by washing in detergent. In other after-treatments, the shaped article may be dyed, bleached, hot or cold drawn, chemically reacted, or given coatings of lubricants, sizes or the like or other similar treatments.

UTILITY

The process of the present invention is valuable in creating both surface and bulk effects upon shaped articles produced from synthetic organic condensation polymers. It may be employed upon textiles to affect softness, resilience, tendency to shrink, static propensity, resistance to holemelting, pilling, hydrophilicity, wickability, and the like. It is useful in changing such properties as tenacity, elongation, modulus, creep, compliance ratio, work recovery, tensile recovery, decay of stress, wet properties, high-temperature properties, abrasion and wear resistance, moisture regain, flex life, hydrolytic stability, heat-setting properties, boil-off shrinkage, drycleaning properties, heat stability, light durability, zero strength temperature, melting point, soilability, ease of soil removal, laundering properties, wash-wear properties, liveliness, crease resistance, crease recovery, torsional properties, hysteresis properties, fiber friction, dyeability (depth, rate, permanence and uniformity), printability, washfastness of dyes or finishing treatments (resins, ultraviolet absorbers, etc.), handle and drape properties (stiffening or softening), heat-yellowing, snag resistance, elasticity, density, ease in textile processability, solubility (insolubilization or increase in solubility), bleachability, surface reactivity, delustering action, drying properties, fabric life, crimpability, stretchability, fabric stabilization, compressional resilience (rugs), thermal and electrical conducitvity, transparency, light transmittance, air and water permeability, fabric comfort, felting, ion exchange properties, germicidal properties, adhesion, overall appearance and combinations of these as well as others.

In addition to the above modifications which it may be desirable to effect in fibrous articles, there are other modifications which are particularly useful in other substrates, for example, in films. By way of illustration, polymeric films may be modified to improve adhesion to various coating or laminating agents which it may be desirable to adhere thereto, to change "slip" or the ease with which one film slides over another, to produce non-reflective or decorative coatings on film or sheet, to improve the ease of printing colors on such sheet and many other modifications such as will readily suggest themselves to one skilled in the art.

It is apparent that those properties which are not primarily a function of surface characteristics (e.g., tenacity, elongation, modulus, and the like) may be more conveniently modified by using modifiers which penetrate the polymeric substrate prior to irradiation-grafting, thus producing a graft copolymer extending throughout the penetrated volume. It is also apparent that at times it may be desirable to allow one or more modifiers to penetrate the substrate, and coat one or more modifiers on the surface of the polymer, then initiate grafting simultaneously by irradiating the shaped article.

The shaped article may be in the form of a woven or knitted fabric, fabricated articles for clothing or industrial use, a reinforcement for composite structures (such as cords for mechanical rubber goods, fiber or laminates, etc.), bristle or artificial straw, rod, bar, sheet, plate, laminate, and the like, as well as other forms of special shape.

This application is a continuation-in-part of United States applications 499,754 filed April 6, 1955, and 503,790 filed April 25, 1955, both abandoned.

Many other modifications will be apparent to those skilled in the art from a reading of the above description without a departure from the inventive concept.

We claim:

1. A process for producing a novel, modified solid shaped structure of a condensation polymer which comprises impregnating a solid shaped structure from a condensation polymer with a fluid comprising an organic compound, the said fluid being free of any compound capable of free radical initiated self-polymerization, substantially chemically inert to the said condensation polymer and being a fluid in which the said condensation polymer is substantially insoluble and thereafter subjecting the impregnated structure to bombardment with ionizing radiation having an energy of at least about 50 electron volts to provide a radiation dosage between about 5000 rads and that at which substantial degradation of the reactants occurs to produce chemical bonds between the said organic compound and the said condensation polymer.

2. The process of claim 1 wherein the shaped structure is filamentary.

3. The process of claim 1 wherein the shaped structure is a film.

4. The process of claim 1 wherein the said bombardment is with electrons having an energy of at least about 100,000 electron volts.

5. The process of claim 1 wherein the said bombardment is with protons.

6. The process of claim 1 wherein the said bombardment is with deuterons.

7. The process of claim 1 wherein the said bombardment is with alpha particles.

8. The process of claim 1 wherein the said bombardment is with neutrons.

9. The process of claim 1 wherein the said bombardment is with high energy electromagnetic radiation.

10. The process of claim 1 wherein the organic compound is permitted to diffuse into the substrate prior to irradiation to produce deep-seated modification.

11. The process of claim 1 wherein the irradiation is performed before the organic modifier diffuses into the substrate to produce a surface-localized modification.

12. The process of claim 1 wherein the said organic compound is a synthetic organic polymeric material applied as a low viscosity solution.

13. The process of claim 1 wherein the said organic compound is a synthetic organic polymeric material applied as a low viscosity melt.

14. The process of claim 1 wherein the bombardment occurs in the presence of an antioxidant.

15. A process which comprises intimately contacting a solid preformed structure formed from a condensation polymer, with a fluid comprising an organic compound, the said fluid being substantially chemically inert to the said condensation polymer and being a fluid in which the said condensation polymer is substantially insoluble until the said organic compound has diffused to a substantial depth into the cross-sectional area of the said structure and thereafter subjecting the said structure to ionizing radiation having an energy of at least about 50 electron volts to provide a radiation dosage that is between about 5000 rads and that at which substantial degradation of the reactants occurs, thereby causing chemical adherence between the said condensation polymer and the said organic compound.

16. A process for modifying the properties of a textile without destruction of its textile properties which comprises intimately contacting a textile structure, filamentary components of which are formed from a condensation polymer, with a fluid comprising an organic textile modifying compound, the said fluid being one in which the said condensation polymer is substantially insoluble the said fluid being substantially chemically inert to the said condensation polymer, removing the excess of the said fluid and thereafter subjecting the said textile to ionizing radiation having an energy of at least about 50 electron volts to provide a radiation dosage that is between about 5000 rads and that at which substantial degradation of the reactants occurs, thereby causing chemical adherence between the said condensation polymer and the said organic compound.

17. The process of claim 16 wherein the said organic modifying compound is hydrolyzable.

18. The process of claim 17 wherein the said condensation polymer is a polyester.

19. The process of claim 17 wherein the said organic modifying compound is methyl acrylate.

20. The process of claim 16 wherein the said condensation polymer is polyhexamethylene adipamide.

21. The process of claim 16 wherein the said condensation polymer is polycaproamide.

22. The process of claim 16 wherein the said textile is a yarn.

23. A process for producing a novel modified solid shaped structure of a condensation polymer which comprises impregnating a solid shaped structure produced from a condensation polymer with a fluid organic compound substantially chemically inert to the said condensation polymer and in which the said condensation polymer is substantially insoluble and thereafter subjecting the solid impregnated structure to bombardment with ionizing radiation having an energy of at least about 50 electron volts to provide a radiation dosage that is between about 5000 rads and that at which substantial degradation of the reactants occurs, to produce chemical bonds between the said organic compound and the said condensation polymer.

References Cited by the Examiner

UNITED STATES PATENTS

| | | | |
|---|---|---|---|
| 1,906,402 | 5/33 | Newton | 204—154 |
| 2,668,133 | 2/54 | Brophy et al. | 204—158.1 |
| 2,670,483 | 3/54 | Brophy | 117—1 |
| 2,830,943 | 4/58 | MacKenzie | 204—154 |
| 2,837,496 | 6/58 | Vandenberg | 260—45.5 |
| 2,841,569 | 7/58 | Rugg et al. | 260—45.5 |
| 2,907,675 | 10/59 | Gaylord | 204—154 XR |
| 2,940,869 | 6/60 | Graham | 117— |
| 2,959,565 | 11/60 | Stanton et al. | |

FOREIGN PATENTS

| | | |
|---|---|---|
| 679,562 | 9/52 | Great Britain. |

OTHER REFERENCES

Billmeyer, "Textbook of Polymer Chemistry," pp. 239–240, pub. by Interscience Publishers, N.Y. (1957).

Lawton et al., Nature, volume 172, pp. 76, 77, July 1953.

Sun, "M. Plastics," September 1954, vol. 32, No. 1, pp. 141–144, 146–148, 150, 229–233 and 236–238.

WILLIAM D. MARTIN, *Primary Examiner*.

JOSEPH B. SPENCER, RICHARD D. NEVIUS, D. ARNOLD, *Examiners*.